Figure 1A:
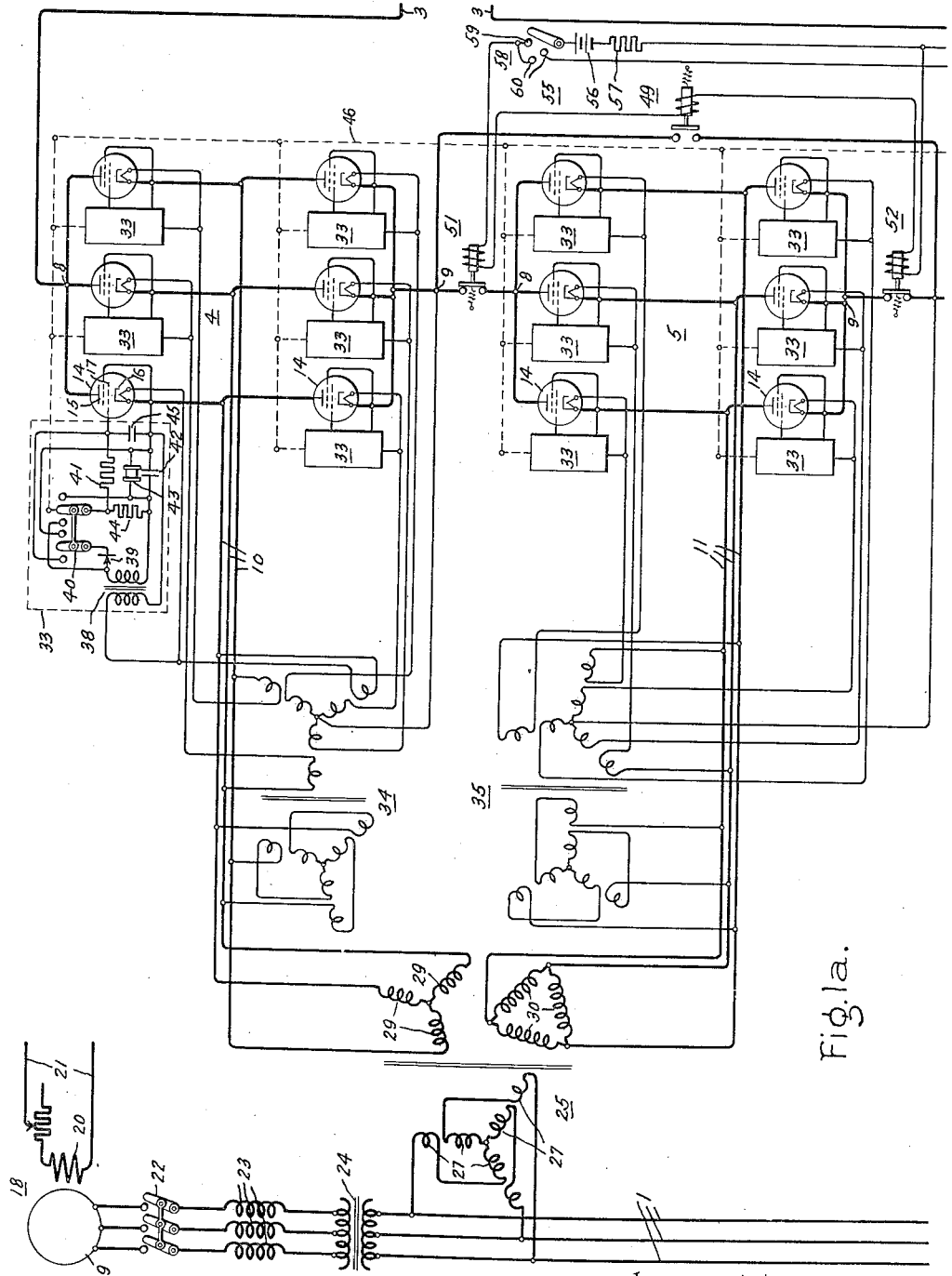

Inventor:
Ernst F. W. Alexanderson,
by Harry E. Dunham
His Attorney.

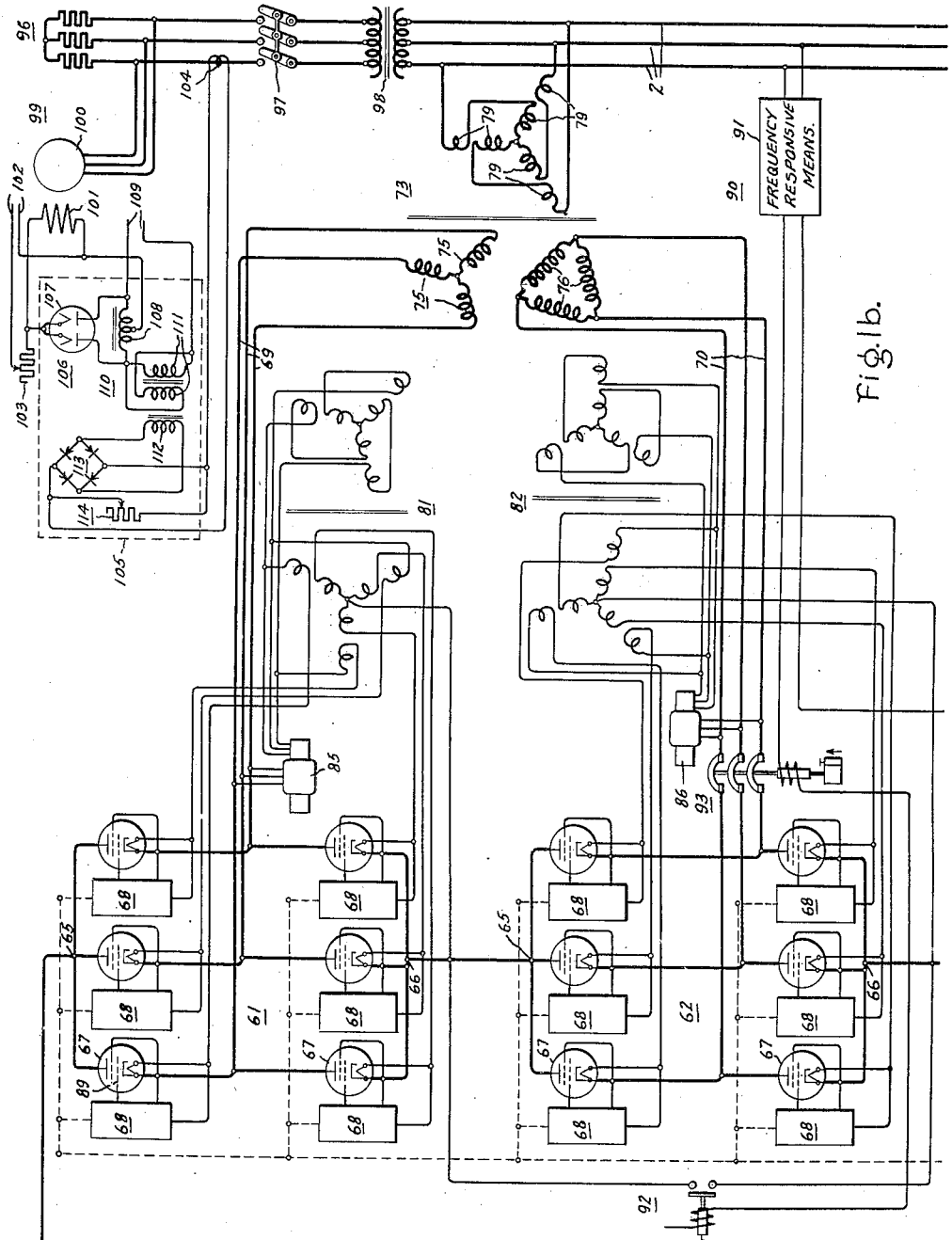

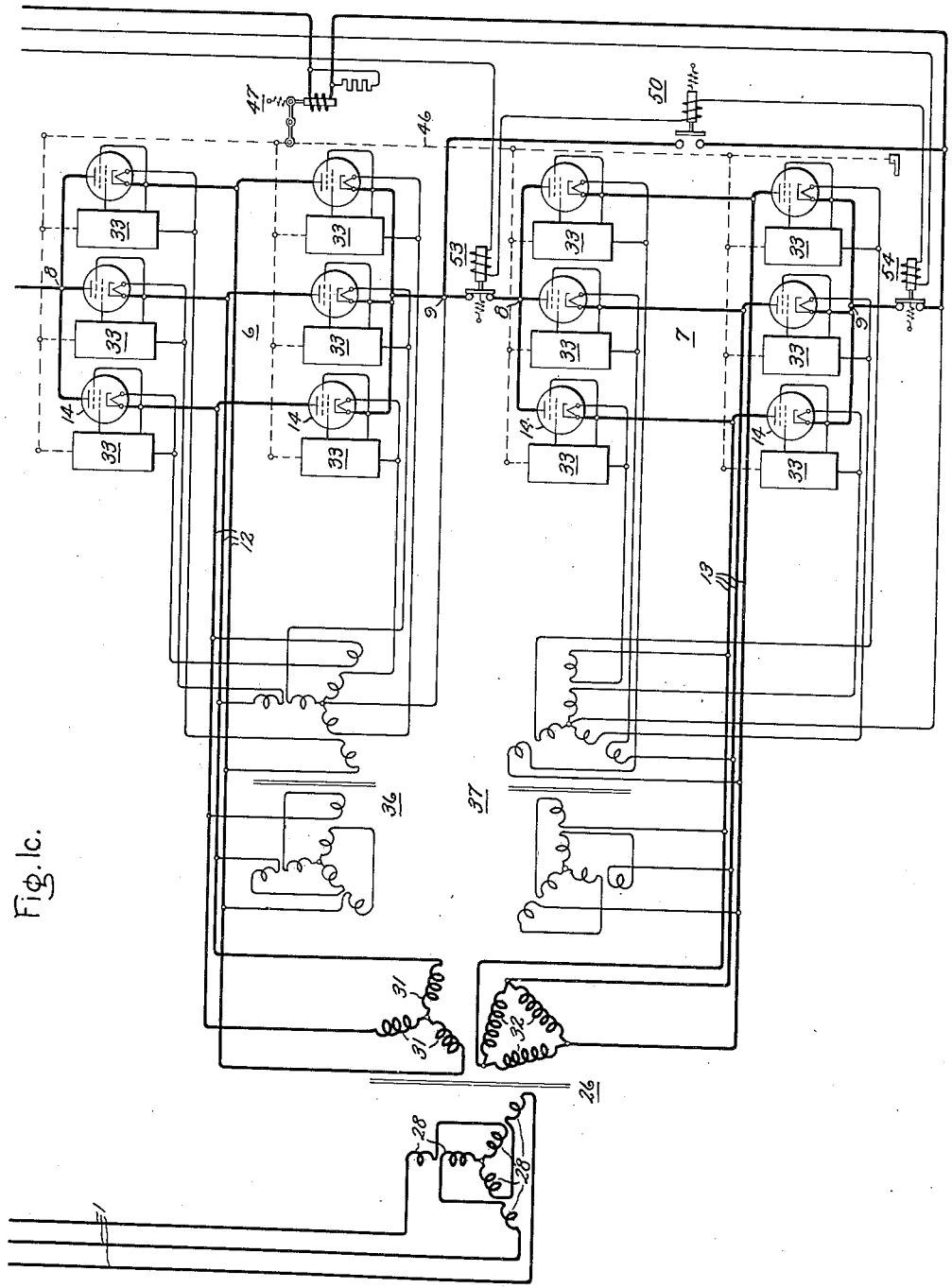

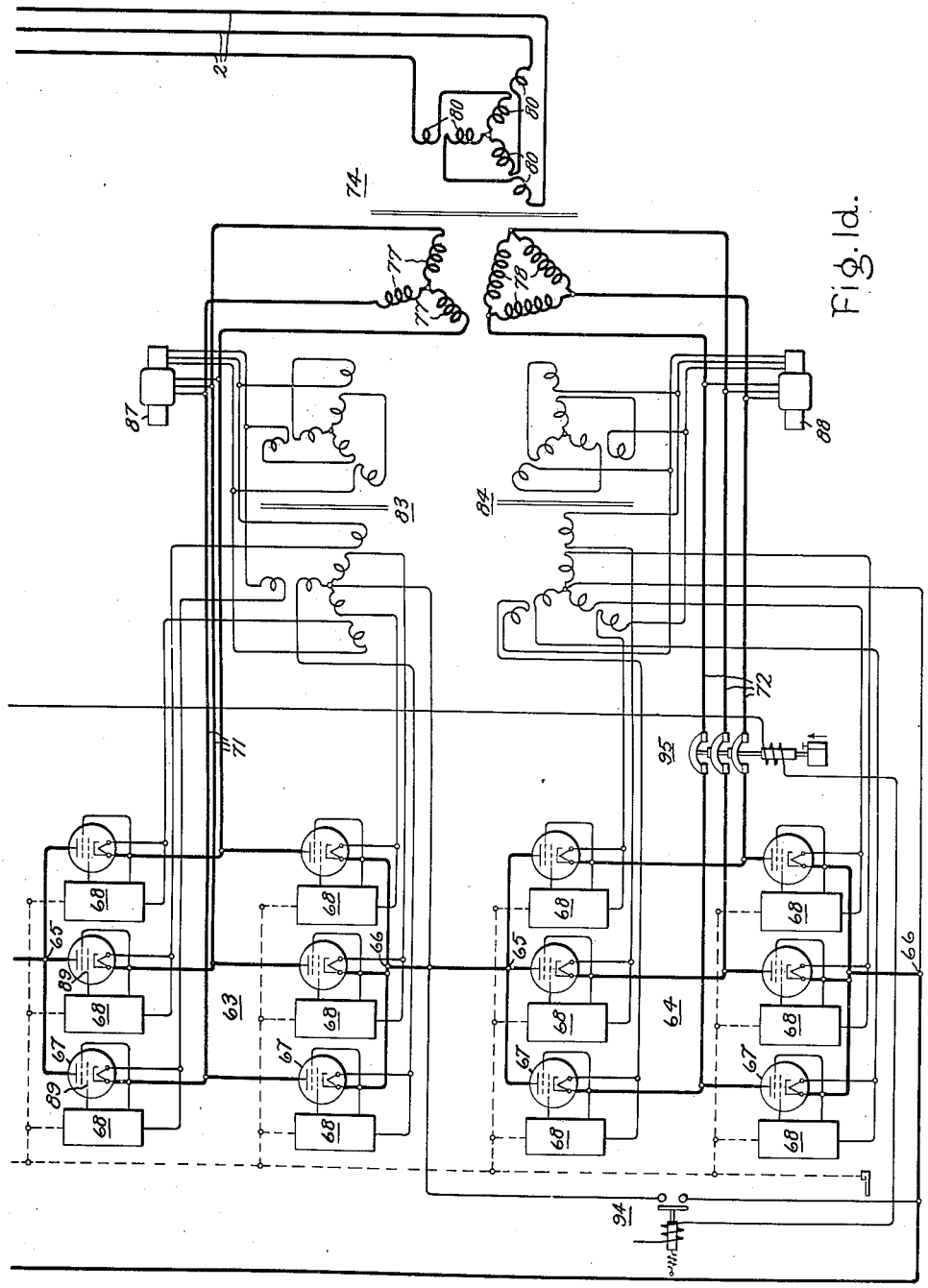

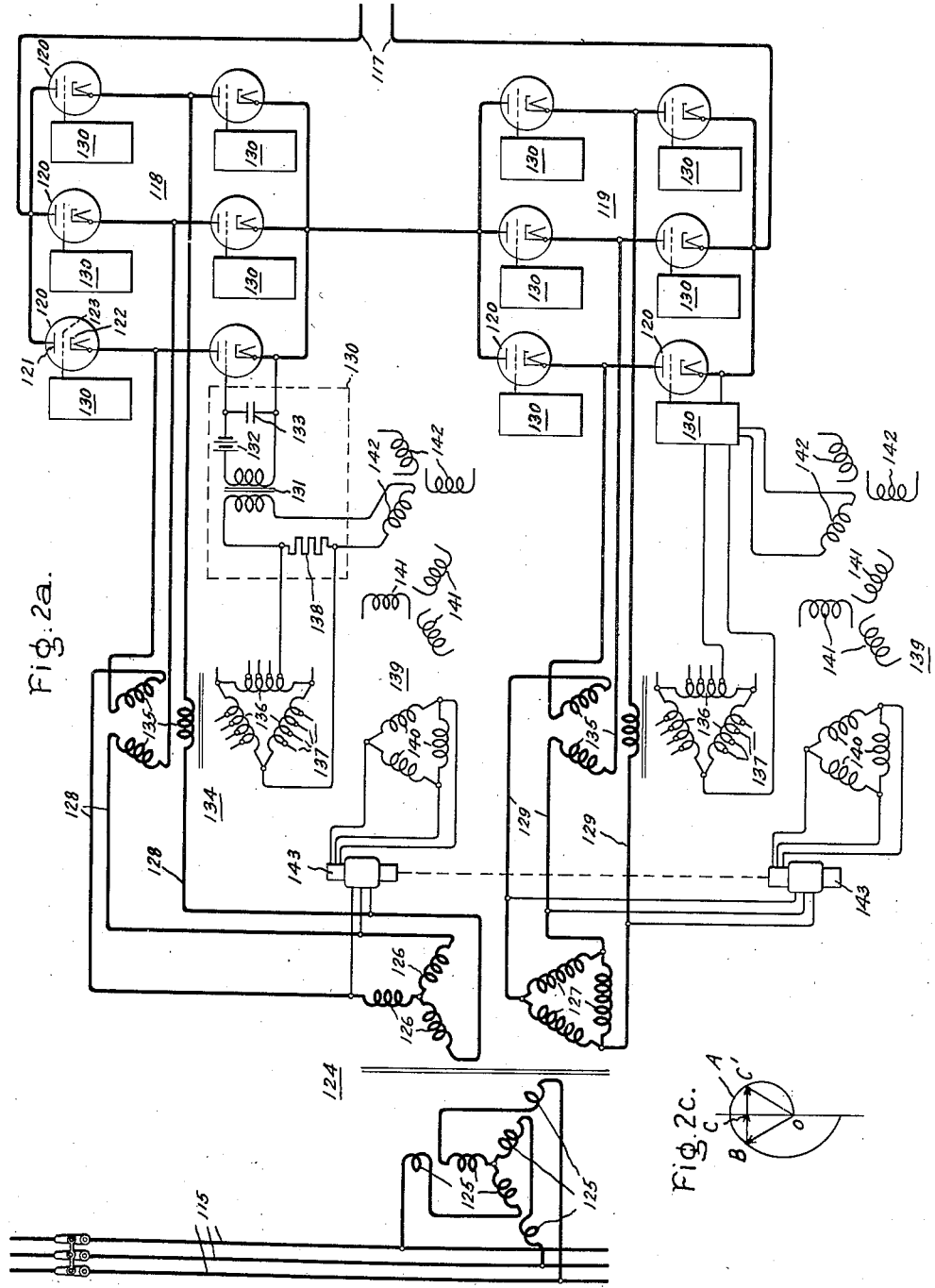

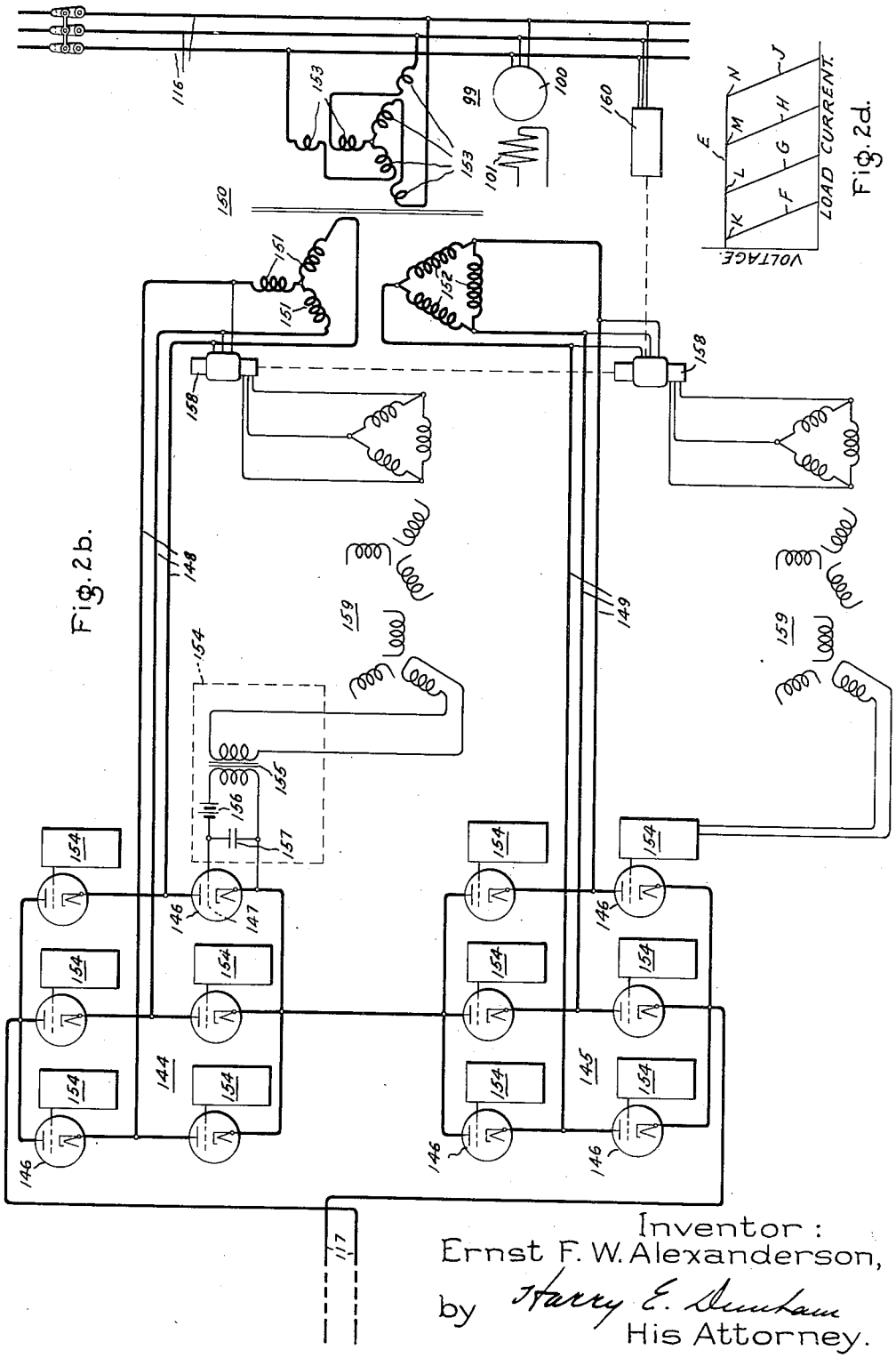

July 16, 1940.  E. F. W. ALEXANDERSON  2,208,183
ELECTRIC POWER TRANSMISSION SYSTEM
Filed Nov. 5, 1938    10 Sheets-Sheet 7

Inventor:
Ernst F. W. Alexanderson,
by Harry E. Dunham
His Attorney.

July 16, 1940.  E. F. W. ALEXANDERSON  2,208,183
ELECTRIC POWER TRANSMISSION SYSTEM
Filed Nov. 5, 1938   10 Sheets-Sheet 8

Inventor:
Ernst F. W. Alexanderson,
by Harry E. Dunham
His Attorney.

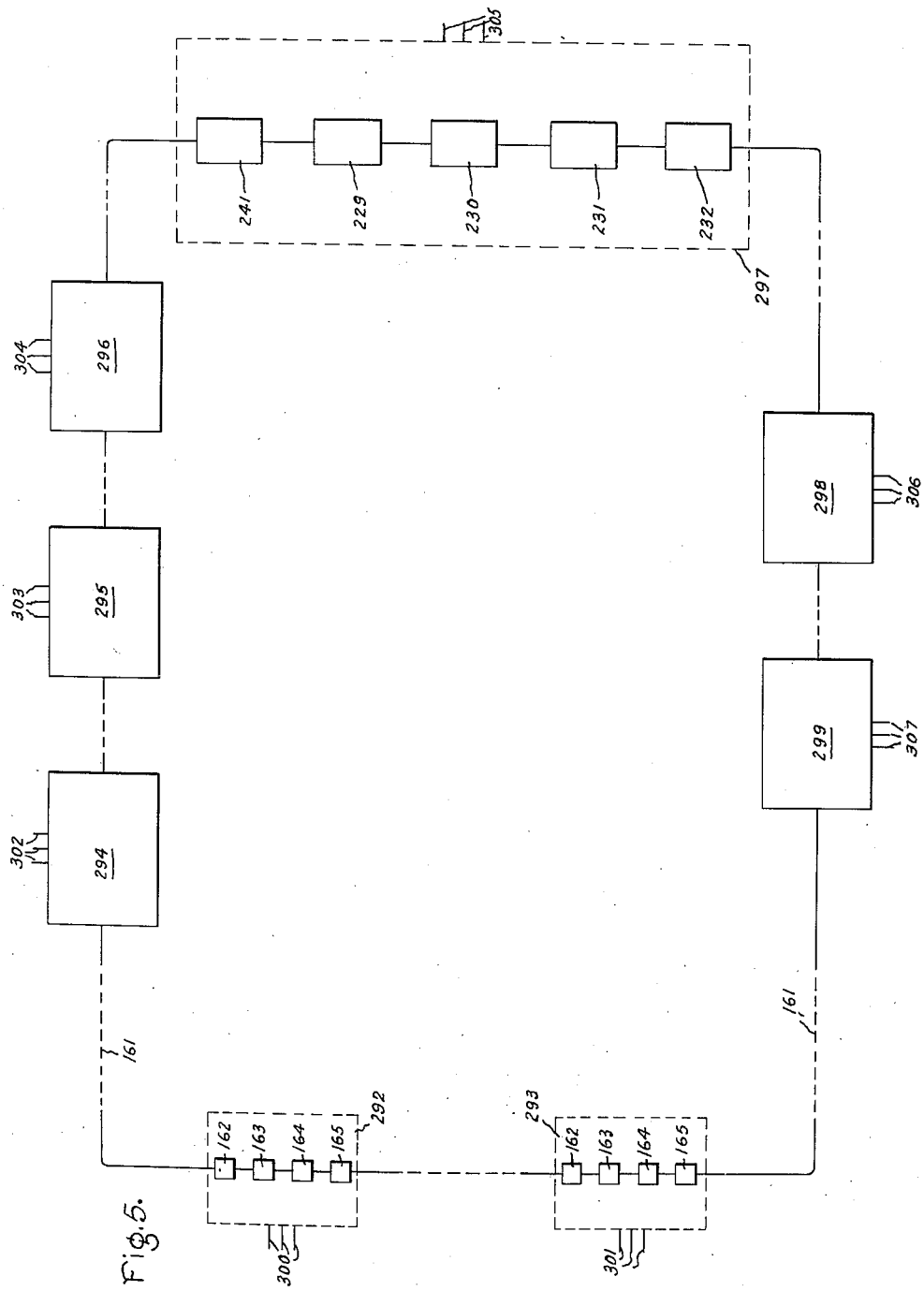

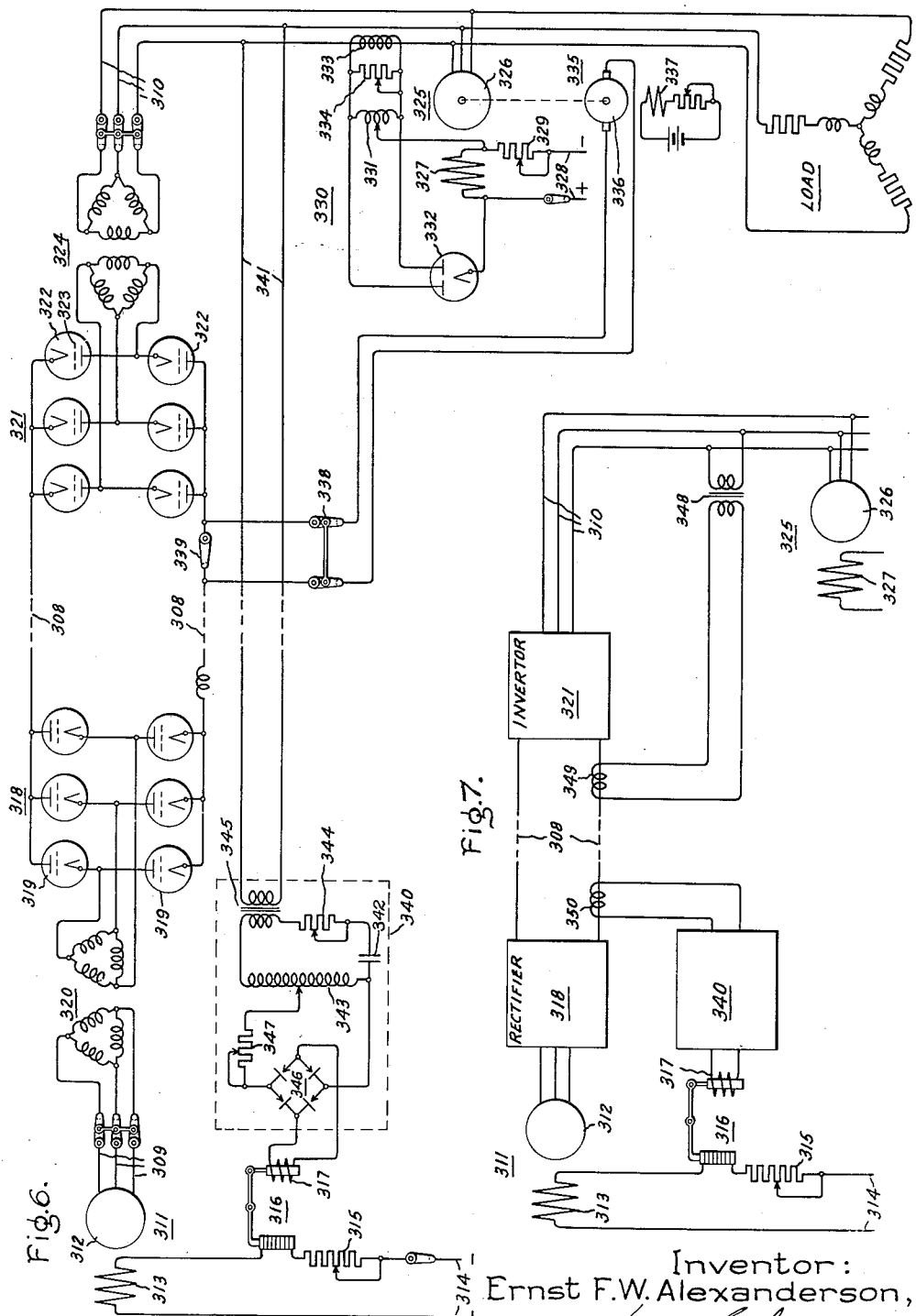

Patented July 16, 1940

2,208,183

UNITED STATES PATENT OFFICE 2,208,183

ELECTRIC POWER TRANSMISSION SYSTEM

Ernst F. W. Alexanderson, Schenectady, N. Y., assignor to General Electric Company, a corporation of New York Application November 5, 1938, Serial No. 239,159

85 Claims. (Cl. 171—97)

My invention relates to electric power transmission systems and more particularly to electric systems for transmitting power by means of direct current.

The transmission of electric power by means of high voltage direct current affords decided basic advantages over the alternating current systems. These advantages are well known and have been considered in great detail in numerous engineering and technical publications. Some of these advantages are simplicity in line equipment, economy in copper, relatively simple insulation conditions, reduced losses, lack of major inductive and capacitive reactance phenomena, simplicity and ease of operation and the non-existence of the stability problem.

Heretofore it has been proposed to use electric valves in high voltage systems for transmitting power by means of direct current systems because of the many inherent advantages obtainable by the use of electric valves. Some of the advantages afforded by the use of electric valves in systems of this nature are low initial cost, simplicity of control and facility of operation.

The Thury system of transmission of electric current by means of constant current direct current has been found to operate very satisfactorily in Europe, but has always been subject to the necessity of rotating machines with mechanical commutators at both the generating and receiving stations. While the Thury system has been satisfactory from the standpoint of a transmission system, it has left much to be desired in connection with distribution applications. The Thury system has always been considered as a transmission development and has not offered the flexibility of operation and ease of control which are necessary and important to systems which are required to function both as transmission systems and as distribution systems. In accordance with the teachings of my invention described hereinafter, I provide new and improved electric power transmission systems for the transmission of power by means of direct current and which obviate many of the disadvantages present in the prior art arrangements.

It has also been proposed heretofore to transmit power by means of direct current of constant value. Electric valve apparatus has been used in systems of this nature. However, it is appreciated that in systems of this kind the relatively large power losses at low values of power are objectionable. These losses remain substantially constant throughout the entire range of power transmitted due to the fact that the current remains constant. In accordance with the teachings of my invention described hereinafter, I provide a new and improved electric valve system for transmitting power by means of direct current and in which the above mentioned disadvantage is obviated.

It is an object of my invention to provide new and improved electric power transmission systems.

It is another object of my invention to provide new and improved electric systems for transmitting power by means of direct current.

It is a further object of my invention to provide new and improved electric power transmission systems for transmitting power by means of direct current at variable power levels.

It is a still further object of my invention to provide new and improved electric power systems for transmitting power by means of direct current at different predetermined current levels.

It is a still further object of my invention to provide new and improved electric power transmission systems for transmitting power by means of direct current at a predetermined voltage for a definite range of power transfer and for effecting transfer of power at substantially constant current when the system demands power in excess of the range.

In accordance with the illustrated embodiments of my invention, I provide new and improved electric power transmission systems in which power is transmitted by means of high voltage direct current and which are capable of transmitting power between alternating current circuits and direct current circuits, or between alternating current systems through translating apparatus comprising a direct current circuit or link. More particularly, I provide a direct current electric power transmission system for transmitting power at different predetermined power levels depending upon the load requirements of the associated system, or systems. By selection or adjustment of the power level at which power is transmitted, the systems may be operated at high efficiencies irrespective of the amount of power being transmitted.

In one of the embodiments of my invention, I provide a direct current power transmission system in which each of the receiving and transmitting stations comprises a plurality of serially connected units, or circuits, which are connected in series relation with respect to each other and which are connected to transmit energy to or receive energy from a direct current circuit. Each of the units includes electric valve converting apparatus, such as a rectifier or an inverter, having direct current terminals connected in series relation with each other and connected to the direct current circuit. The electric valve rectifiers or inverters are energized from or transmit energy to separate alternating current circuits or the same alternating current circuit. The power lever at which power is transmitted may be controlled by controlling the electric valve means. For example, the direct current terminals of the rectifiers and the inverters may be controlled in accordance with predetermined controlling influences to control the power level. Short circuiting switches may be connected across the direct current terminals of the rectifiers and inverters to render inoperative the associated electric valve circuit to control the power level. Additional isolating switches may be connected to the associated alternating current circuits to disconnect completely the rectifiers and the inverters.

In accordance with another illustrated embodiment of my invention, I provide a new and improved high voltage direct current power transmission system for transmitting energy from a source of power to an alternating current load circuit. The system is applicable for energizing an isolated alternating current load circuit, that is, an alternating current load circuit which is not fed by a synchronous system. This type of transmission system is sometimes referred to as a "stub-end feed." In systems of this nature I provide an improved transmission circuit which controls not only the voltage but the frequency of the alternating current load circuit. The voltage and frequency are maintained by means of a synchronous dynamo-electric machine, or a synchronous condenser, the excitation of which is varied in response to load to maintain the voltage and frequency at substanially constant predetermined values.

In another illustrated embodiment of my invention, I provide an improved electric valve system for energizing a direct current transmission circuit, and which may be employed for the transmission of electric power between a constant voltage alternating current circuit and a direct current circuit, or may be employed for the transmission of power between two constant voltage alternating current circuits over a direct current transmission line. The transmitting station comprises a plurality of serially connected rectifiers, each of which comprises an electric valve means of the controlled type having control members for controlling the conductivities thereof. Power is transmitted at substantially constant voltage over a predetermined range of power transfer, and when the power tends to exceed a definite predetermined value the energization of the control members is varied to transmit power at a substantially constant power level. The receiving stations each include a plurality of serially connected electric valve inverters each comprising electric valve means of the controlled type having control members for controlling the conductivity thereof. The power transmitted by the various electric valve inverters is controlled by means of circuits which are operated in response to the frequency of the associated alternating current load circuit. The frequency responsive means also tends to maintain the voltage of the alternating current load circuit at a substantially constant value.

In accordance with the illustrated embodiment of another feature of my invention, I provide a direct current transmission system in which power may be transmitted at different predetermined values of direct current. That is, the current transmitted over the direct current line is maintained at a predetermined selected value depending upon the power transmitted and the load requirements. The direct current may be adjusted or varied to suit the operating conditions and may be adjusted in response to load to effect a reduction of the power losses of the system when the amount of power transmitted is relatively small. Conversely, the current level may also be increased to supply additional load when the amount of power to be transmitted is increased. The transmitting stations comprise a plurality of serially connected electric valve rectifiers, and each of the receiving stations comprises a plurality of serially connected electric valve inverters. The amount of power transmitted is determined by the current level, the number of serially connected units in operation and the voltage of each of the serially connected units. The current transmitted to the direct current circuits is maintained at a substantially constant value by controlling the excitation of an alternating current generator which supplies the several electric valve rectifiers. Means are provided to render operative and inoperative the several electric valve rectifiers to control the power level at which power is transmitted to the respective receiving stations. That is, means responsive to a predetermined controlling influence such as the power transfer selectively shunt the direct current terminals of the electric valve rectifiers to control the voltage limits, and hence the power limits, through which power may be transmitted to the load circuits for a definite preselected value of the direct current. Automatic means, responsive to the amount of power transmitted by the system, are provided to select the current level at which power is transmitted. At the receiving stations, I provide a plurality of serially connected electric valve inverters connected in series relation with each other for transmitting power from the direct current circuit to an associated alternating current load circuit. The serially connected electric valve inverting apparatus at the receiving stations are arranged to control the power transmitted to the load circuit. A synchronous condenser is connected to the load circuit to maintain the voltage at a substantially constant value, and I provide means for controlling the conductivity of the auxiliary electric valve circuit to control the amount of power transmitted to the load circuit. The auxiliary electric valve circuit is responsive to the frequency of the load circuit. Additional means is provided to disconnect and connect the various serially connected units at the receiving station to transmit power at a predetermined voltage to the load circuit irrespective of the current level at which power is transmitted over the direct current circuit.

In accordance with a still further feature of the illustrated embodiments of my invention, I provide a new and improved electric power transmission system of the constant current or variable current-level system in which the transmitting and receiving stations are all connected in series relation with each other. That is, the current of the direct current transmission line flows through all the transmitting and receiving units. In this respect the systems disclosed may be defined as series constant current or series variable current-level direct current power transmission systems.

In accordance with another feature of the illustrated embodiments of my invention, I provide a new and improved high voltage direct current power transmission system for energizing an isolated alternating current load circuit, that is, for energizing a load circuit which is not connected to a synchronous alternating current system. The voltage and frequency of the alternating current load circuit is controlled by means of a synchronous dynamo-electric machine connected to the alternating current load circuit. The field excitation of the synchronous machine is varied in accordance with the load current in order to maintain the frequency substantially constant, and the direct current voltage of the transmission line is varied in response to the frequency of the alternating current load circuit.

Figure 3A:
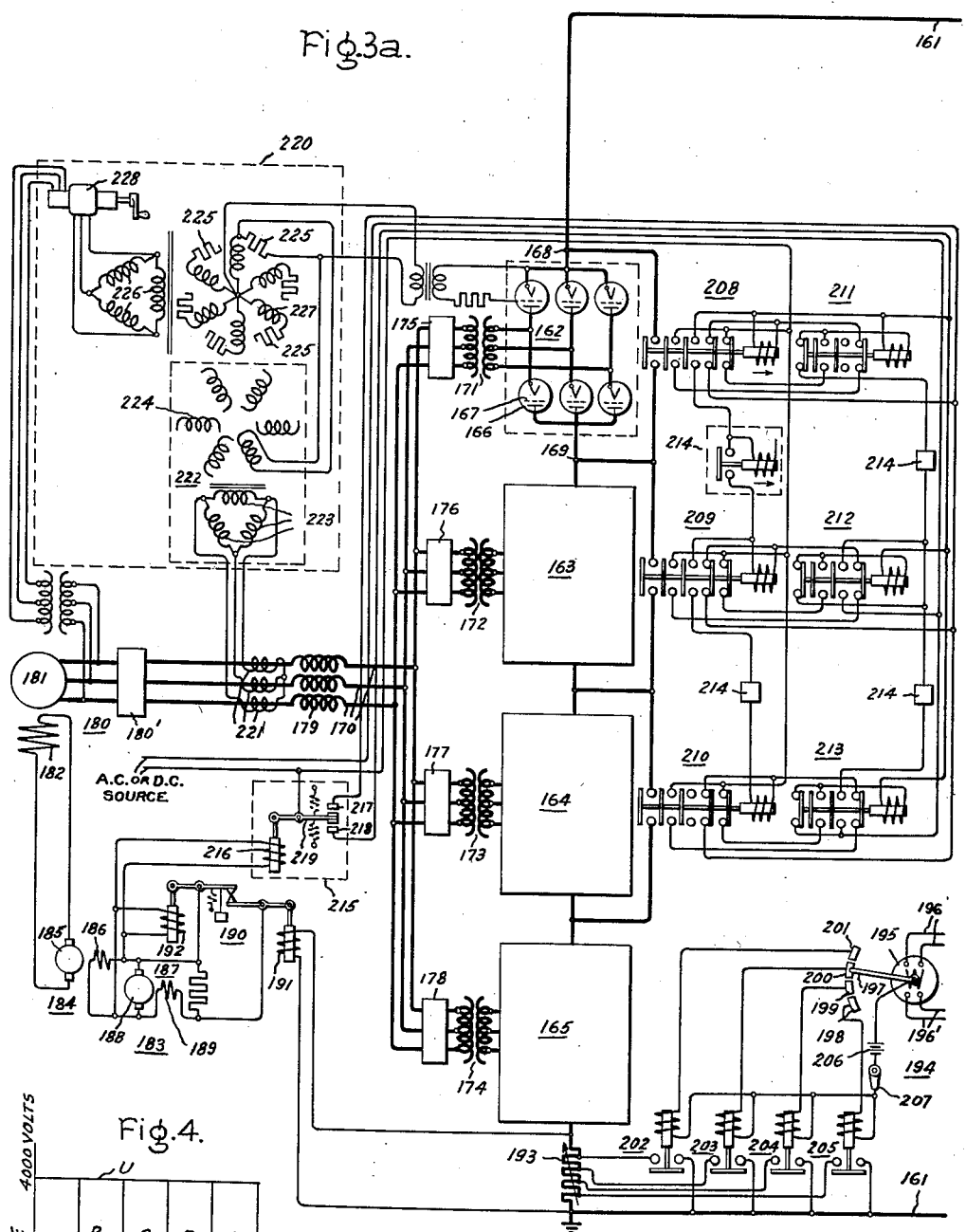
Figure 4:
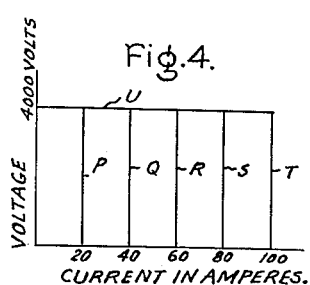
Figure 3B:
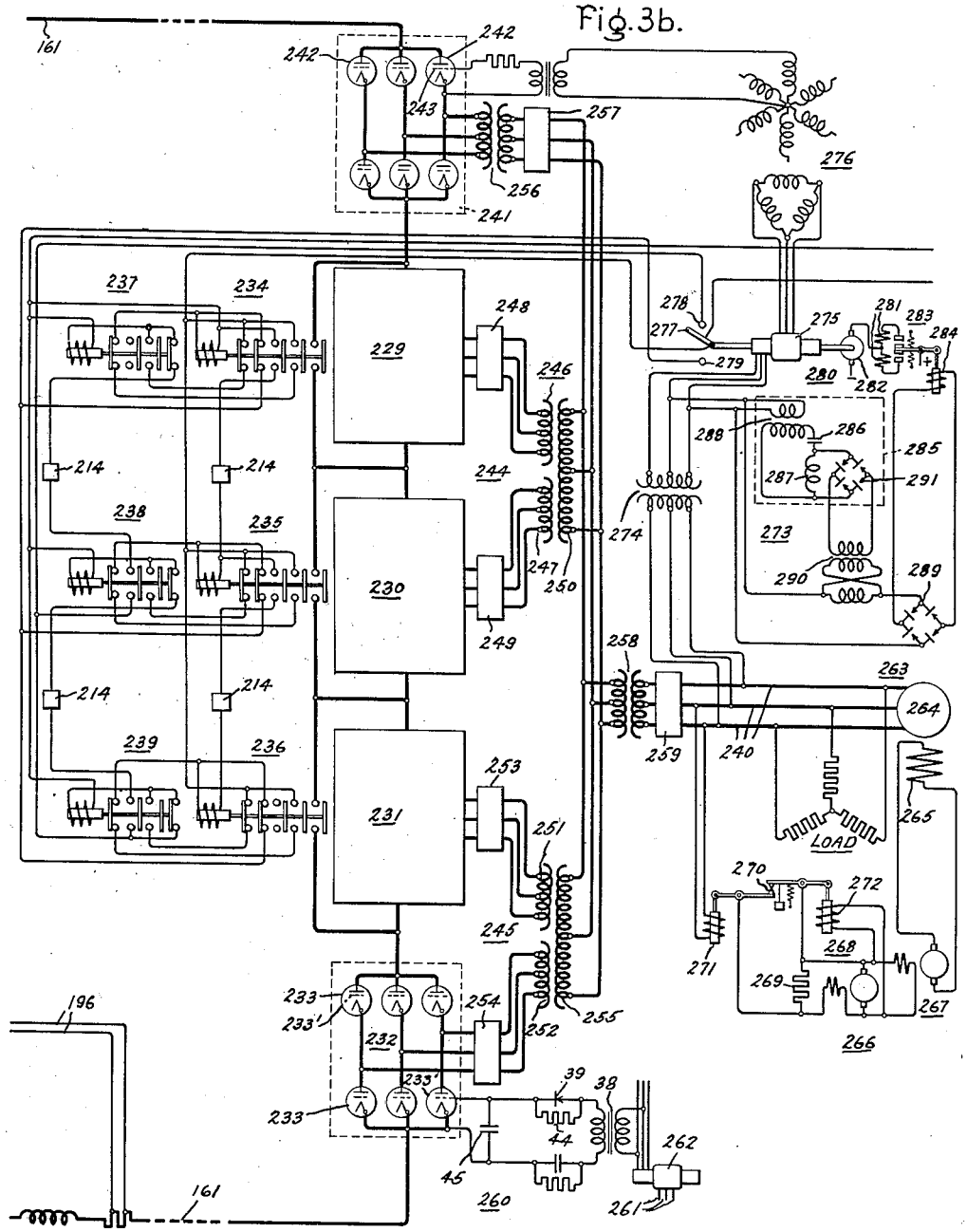

For a better understanding of my invention, reference may be had to the following description taken in connection with the accompanying drawings and its scope will be pointed out in the appended claims. Figs. 1a–1d diagrammatically illustrate an embodiment of my invention as applied to a direct current transmission system for transmitting power between two constant voltage alternating current circuits and in which the transmitting and the receiving stations each comprise a plurality of serially connected electric valve rectifiers and inverters, respectively. Figs. 2a and 2b diagrammatically illustrate another embodiment of my invention as applied to a direct current transmission system in which power is transmitted between two constant voltage alternating current circuits and in which current is transmitted at substantially constant voltage for a predetermined range of power transfer and power is thereafter transmitted at constant power. Figs. 2c and 2d represent certain operating characteristics of the arrangements shown in Figs. 2a and 2b. Figs. 3a–3b diagrammatically illustrate an embodiment of my invention as applied to a direct current transmission system in which electric power is transmitted at predetermined different current levels. Fig. 4 represents operating characteristics of the arrangement shown in Figs. 3a–3b. Fig. 5 diagrammatically illustrates a high voltage direct current power transmission system embodying a number of the aforementioned transmitting and receiving units, such as the arrangements shown in Figs. 3a–3d. Figs. 6 and 7 diagrammatically illustrate other embodiments of my invention as applied to a direct current transmission system in which the magnitude of the direct current voltage, and hence the power thereof, is controlled in accordance with the frequency of the alternating current load circuit.

Referring now to Figs. 1a–1d, which together constitute a complete transmitting and receiving system, I have shown my invention as applied to a high voltage, direct current electric power transmission system for transmitting power between a constant voltage, alternating current circuit 1 and a constant voltage, alternating current circuit 2 through a direct current transmission line 3. It is to be understood that the arrangement illustrated in Figs. 1a–1d is capable of transmitting power between the alternating current circuits 1 and 2, and for the purpose of explaining the system, the transmitting apparatus associated with circuit 1 will be considered as the transmitting station, and the translating apparatus associated with the receiving apparatus will be considered as the receiving station. At the transmitting station, I provide a plurality of serially connected electric valve rectifiers 4—7, each having direct current terminals 8 and 9 and each being energized from alternating current circuits 10, 11, 12 and 13, respectively. Each of the electric valve rectifiers 4—7 comprises a plurality of electric valve means 14 which are preferably of the type employing an ionizable medium, such as a gas or a vapor, and each of which comprises an anode 15, a cathode 16 and a control member or grid 17 which controls the conductivity thereof.

The alternating current circuit 1 may be energized from any suitable source, such as a dynamo-electric machine 18 which may be of the synchronous type comprising an armature member 19 and a field winding 20 which is energized from a suitable source of direct current 21. A switch 22 and air core reactances 23 may be connected between the armature 19 and the transmitting station. A step-up transformer 24 may be interposed between the machine 18 and the translating apparatus if an increased voltage is desired.

As an agency for providing a polyphase system of voltages for energizing the various electric valve rectifiers 4—7 to obtain a desired wave form of the direct current transmitted to the transmission line 3, I employ transformers 25 and 26 having primary winding 27, 28 and secondary windings 29, 30; 31, 32 respectively. The primary windings and the secondary windings of transformers 24 and 25 may be arranged to provide a polyphase system at voltages such as twenty-four phase system of voltages. Circuits 10—13 are energized from secondary windings 29—32, respectively, and furnish polyphase alternating current to electric valve rectifiers 4—7, respectively. Certain features of the connections of transformer 25 are disclosed and claimed in my copending divisional application Serial No. 321,713, filed March 4, 1940, and which is assigned to the assignee of this application.

It is to be noted that I may employ a plurality of groups of serially-connected electric valve rectifiers. That is, each group may include a number of arrangements such as rectifiers 4—7, all of which may be connected in series relation with each other.

I provide a plurality of control excitation circuits 33 each associated with a different one of the electric valve means 14 in electric valve rectifiers 4—7. These excitation circuits serve as arrangements for controlling the conductivities of the electric valves 14. The excitation circuits of electric valve rectifiers 4—7 are energized from transformers 34—37, respectively. It will be noted that the transformers 34—37 also supply energy to the cathode heating elements of the electric valves 14 in the electric valve rectifiers 4—7. The excitation circuits 33 may be of any conventional type well known in the art, and for the purpose of illustrating my invention I have shown the excitation circuits 33 as being of the type disclosed and claimed in United States Letters Patent 2,114,828 granted April 19, 1938 upon an application of B. D. Bedford and assigned to the assignee of the present application. Each of the excitation circuits 33 comprises a transformer 38 energized from a suitable phase of the associated transformers 34—37, and a unidirectional conducting device such as a contact rectifier 39 which is arranged to be connected in series relation with the control grid 17 of the associated electric valve 14. A suitable switch 40 may be connected between the unidirectional conducting device 39 and the grid 17 to impress upon the control grid 17 a negative unidirectional biasing potential which renders the valve 14 nonconductive when transformer 38 is not directly connected to grid 17. A resistance 41 is arranged to be connected across the unidirectional conducting device 39 when the switch 40 is in the left-hand position to afford a path for the grid current in the event the unidirectional conducting device 39 becomes defective. This arrangement of the parallel connected resistance 41 and the rectifier 39 affords a relatively low impedance path to the flow of normal grid current and offers a relatively great impedance to the flow of "positive ion" current. To impress on the control grid 17 a negative unidirectional biasing potential, I employ a parallel connected capacitance 42 and a resistance 43. A resistance 44 may be connected in series relation with resistance 41. Resistance 43 may be of the type having a nonlinear impedance current characteristic, if desired. When the switch 40 is in the left-hand position, the electric valve 14 is rendered conductive periodically by the voltage supplied by transformer 38. When the switch 40 is in the right-hand position, the electric valve 14 is maintained nonconductive by the negative unidirectional biasing potential appearing across the terminals of capacitance 42. Capacitance 45 is connected across the grid 17 and anode 16 to absorb extraneous voltages. The switches 40 of the excitation circuits 33 may be interconnected by means of the gang controller 46. The controller 46 may be actuated by a suitable overload protective means, such as a current responsive relay which automatically throws the switches 40 to the right-hand position to render the electric valve means nonconductive in the event of overload. A suitable inductive reactance 48 may be connected in series relation with the direct current circuit 3.

In order to control the power level at which power is transmitted over the direct current circuit 3, I provide means for controlling the individual electric valve rectifiers 4—7. For example, I provide switches 49 and 50 associated with electric valve rectifiers 5 and 7, respectively, for short circuiting the direct current terminals 8 and 9 to render the electric valves selectively operative and inoperative. As a means for isolating the electric valve rectifiers, I also employ switches 51, 52 and 53, 54 associated with electric valve rectifiers 5 and 7, respectively. The rectifiers 4—7 are arranged to transmit a predetermined amount of power; that is, each is designed to transmit power at different voltages depending upon the voltage of circuit 1. In the event the power demanded by the system decreases, certain of the electric valve inverters may be disconnected from the transmitting station to decrease the power level. In order to disconnect certain predetermined rectifying units or groups, I provide a circuit 55 for energizing the actuating coils of switches 49—54. Circuit 55 may comprise a suitable source of current, such as a battery 56, a current limiting resistance 57 and a switch 58 having contacts 59 and 60. Switch 58 may be controlled in accordance with a predetermined controlling influence, such as the amount of power transmitted by the direct current circuit 3 to control the number of rectifying units operatively connected at the transmitting station.

The rectifying units 5—7 may be selectively connected and disconnected in order to maintain the direct current transmitted at a substantially constant value or within a predetermined range of values in accordance with the power demanded by the system. Switch 58 may be automatically operated in response to a predetermined controlling influence, such as the power or the current of the direct current circuit 3, in order to obtain this type of control. When contacts 59 are engaged, the rectifying unit 5 is rendered inoperative and when contacts 60 are engaged, rectifying units 5 and 7 are rendered inoperative effecting corresponding decreases in the power level at which power is transmitted. Switches 51—54 are arranged to open with a predetermined time delay. Since the actuating coils of the switches for each rectifying unit are energized in series relation, it is desirable to effect closure of switches 49 and 50 prior to the opening of the associated switches 51, 52, 53 and 54, respectively.

At the receiving station associated with the alternating current circuit 2, I provide a plurality of serially connected inverting circuits or units 61—64 each having direct current terminals 65 and 66. The inverting units 61—65 are connected in series relation with each other and are connected to be energized from the direct current circuit 3. Each of the inverting units 61—64 comprises a plurality of electric valve means 67 which are also preferably of the type employing an ionizable medium, such as a gas or a vapor, and each is controlled by means of an associated control or excitation circuit 68 which may be the same as excitation circuits 33 described above. The excitation circuits 68 at the receiving station may also be operated by a gang controller to render the electric valves 67 nonconductive when desired. The electric valve inverters 61—64 are connected to the alternating current circuit 2 through alternating current circuits 69—72, respectively. Transformers 73 and 74 are connected between circuits 69—72 and alternating current circuit 2 and are provided with primary windings 75, 76; 77, 78 and secondary windings 79 and 80, respectively. The windings of the transformers 73 and 74 may also be arranged in a twenty-four phase relationship in order that the alternating current transmitted to the circuit 2 is of suitable wave form. When the system is operating to transmit power at different predetermined current levels or within different ranges of current, the electric valve inverters 62 and 64 may be selectively connected and disconnected to energize selectively primary windings 76 and 78, respectively, to transmit power to circuit 2 at substantially constant voltage, or within predetermined ranges of voltage, by controlling the resultant ampere-turns or the resultant magnetic field linking secondary windings 79 and 80 of transformers 73 and 74, respectively. The broad feature of transmitting power between constant current, direct current circuits and constant voltage, alternating current circuits by arrangements of this nature is disclosed and claimed in a copending patent application Serial No. D-53,786 of Frank R. Elder, filed concurrently herewith and assigned to the assignee of the present application. Excitation circuits 68 and the cathode heating elements for the electric valves 67 are energized from transformers 81, 82, 83 and 84. Suitable phase shifting devices, such as rotary phase shifters 85—88, are interposed between transformers 81—84 and circuits 69—72 to provide means for controlling the phase of the voltages impressed on the control grids 89 of electric valves 67 and to provide thereby means for controlling and adjusting the amount of power transmitted to the alternating current circuit 2.

To control the amount of power transmitted to the alternating current circuit 2 at the different predetermined power levels demanded by the receiving station, I provide a circuit 90 comprising a frequency responsive means 91 which selectively connects and disconnects predetermined electric valve inverters in the system. For example, the electric valve inverter 62 is provided with a short circuiting or shunting switch 92 and an alternating current isolating switch 93, and the electric valve inverter 64 is provided with short circuiting switches 94 and an alternating current isolating switch 95. The frequency responsive means 91 may be any suitable arrangement for effecting selective operation of the switches 92—95 under varying load conditions. For example, as the load increases, the frequency responsive means connects the inverter 62 operatively in the system and, if the load increases still further, connects the inverter 64 operatively in the system. Of course, as the load decreases the reverse operation is followed.

The load to which the circuit 2 is connected may be represented by circuit 96. A suitable switch 97 and a step-down transformer 98 may be connected between circuit 2 and the load 96, if desired.

As a means for supplementing the inverters 61—64 in the maintenance of the voltage and the frequency of the alternating current circuit 2 substantially constant under varying load conditions, I provide a synchronous dynamo-electric machine 99 having an armature member 100 and a field winding 101. The field winding 101 may be energized from any suitable source of direct current 102 through a current controlling means, such as an adjustable resistor or rheostat 103. In order to maintain the voltage and the frequency of the alternating current circuit 2 substantially constant in a system of this nature, it is important to vary or control the excitation of the synchronous machine 99 in response to the amount of load transmitted. That is, it is necessary to introduce into the circuit for the field winding 101 a component of unidirectional current which varies in accordance with or in response to the load current transmitted. To accomplish this control, I provide a current transformer 104 which furnishes an alternating current which varies in accordance with the load transmitted. Current transformer 104 energizes a load compensating device 105 which transmits variable amounts of unidirectional current to the field winding 101 to control the voltage and the frequency of the synchronous machine 99. The load compensating device 105 may comprise a rectifier 106 which may include a full wave electronic device 107 and a transformer 108 which are energized from any suitable source of alternating current 109. The anode-cathode voltage applied to the electronic discharge device 107 is controlled by means of a saturable reactor 110 having windings 111 connected in series relation with the transformer 108 and the source of alternating current 109. The saturable reactor 110 is also provided with a control winding 112 which is energized by variable amounts of unidirectional current from a full wave rectifier 113 which in turn is energized by the current transformer 104. A suitable current controlling device, such as an adjustable resistance 114 may be connected across rectifier 113.

The operation of the embodiment of my invention diagrammatically illustrated in Figs. 1a–1d will be explained by considering the system when it is operating to transmit power from the alternating current circuit 1 to the alternating current circuit 2 over the direct current transmission line 3. In this embodiment of my invention, power is transmitted at different predetermined values of voltage of the direct current circuit 3 or may be transmitted at different values or ranges of current and the amount of power transmitted is controlled by the number of transmitting and receiving units operatively connected to the direct current circuit 3. For example, the individual electric valve rectifying circuits or units 4—7 may be designed to supply a predetermined terminal voltage, such as 10,000 volts. When all units are connected operatively in series relation, the total voltage impressed across the direct current circuit 3 would, of course, be 40,000 volts. The frequency responsive device 91 at the receiving station controls the number of electric valve inverters which are operatively connected to the alternating current circuit 2 and thereby controls the amount of power transmitted to circuit 2. Let it be assumed initially that the system is operating at substantially 30,000 volts, that is, when power is being transmitted by rectifying units 4, 6 and 7. This condition of operation may be effected by operating switch 58 so that contact 59 is closed, thereby energizing switch 49 and effectively shunting the direct current terminals 8 and 9 of rectifying unit 5. Under such conditions of operation, the frequency responsive device 91 would operate so that inverting unit 62 at the receiving station is effectively short circuited by means of switch 92, and therefore, power would be transmitted from the direct current circuit 3 to the alternating current circuit 2 through inverting devices 61, 63 and 64. If it is desired to transmit a greater amount of power from circuit 1 to circuit 2, switch 58 may be operated so that contacts 59 and 60 are open, effectively connecting rectifying unit 62 in series relation with the other inverter units. The direct current voltage will, of course, be increased correspondingly to 40,000 volts. Upon application of additional load to circuit 2, the frequency of circuit 2 will temporarily decrease and the frequency responsive circuit 90 will operate to put electric valve inverter 62 in operation so that the increased amount of power may be transmitted. Conversely, the frequency responsive circuit 90 will effect a decrease in the number of units connected if the power demand decreases. This action is brought about by the temporary rise in frequency of circuit 2 upon decrease in load. Of course, it is to be understood that the switch 58 may be made to operate in accordance with a predetermined controlling influence such as the power demanded by the direct current circuit 3.

The overload protection means 47 operates to move switches 40 to the right-hand position and to bias the electric valves 14 to a nonconductive condition when the current tends to exceed a safe operating value.

Power is transmitted to the alternating current circuit 2 at substantially constant voltage and frequency. The excitation of the synchronous machine 99, which may act as a synchronous condenser to supply variable amounts of reactive volt-amperes, is varied in accordance with the amount of power transmitted in order that the speed and the frequency of the machine shall remain within a predetermined range of values. The load compensating device 105 increases the energization of field winding 101 upon increase in load, thereby preventing an increase in the frequency of the system. The load compensating device 105 transmits a variable component of unidirectional current to the field winding 101 in addition to the substantially constant unidirectional component of current supplied to the field winding from circuit 102. I have found that this arrangement is very satisfactory for controlling the voltage and frequency in systems where an alternating current circuit is energized from a direct current transmission line and where the load connected to the circuit is of the static type, that is, devoid of other synchronous generating equipment.

An important feature of the embodiment of my invention shown in Figs. 1a–1d, is the manner in which the power flow is controlled by switching in and out certain polyphase groups of windings and the associated electric valve means. As stated above, transformers 25, 26, 73 and 74 are arranged to provide a twenty-four-phase system of voltages. At the transmitting station and the receiving stations, transformers 25, 26 and 73, 74, respectively, provide four six-phase systems displaced in phase with respect to each other. These groups of windings, by operation of the associated electric valve means, are placed in operation and taken out of operation to control the power and the current transmitted. When all the units are connected, the system operates as a twenty-four-phase system and, of course, as the units are disconnected in succession, the system operates as an eighteen-phase or a twelve-phase system.

I have found that when the direct current transmission system of Figs. 1a–1d operates as a substantially constant voltage direct current system that it is important to maintain a predetermined relationship between the volt-ampere characteristics of the transmitter and the receiving units. From a practical operating point of view, there are two kinds of stability to consider in maintaining the system in operation. First, the system must have what is generally termed a relatively high steady state power limit so that the intended amount of load may be transmitted. Second, the system should be designed so that it remains in operation under transient disturbances, such as disturbances occasioned by valve failure, short circuits or instantaneous open circuits of part of the system.

I have found that there is a critical relationship between the volt-ampere characteristic of the transmitter and the volt-ampere characteristic of the receiver which determines whether or not the system will remain in operation during transient disturbances. This critical condition may be defined by saying that the receiver should be stiffer than the transmitter; that is, the change in the receiver voltage per unit of current should be less than the change in transmitter voltage per unit of current. This relationship may be expressed by stating that the slope of the volt-ampere characteristic of the inverter is less than the slope of the volt-ampere characteristic of the transmitter. Thus, if the system does not have the required stability under transient conditions, the remedy is to increase the effective impedance of the transmitter. It should be observed that this relationship is just the opposite to that which is desired in a synchronous alternating current transmission system where increased stabiltiy is obtained by increasing the stiffness of the transmitting unit. The reason for this difference is that the direct current transmission system employing rectifiers and inverters for transmitting power between alternating current circuits and direct current circuits involves an entirely different kind of stability than encountered in the operation of alternating current systems.

In order that the direct current transmission system remain in operation under transient conditions, it is important that at all times the inverter circuit be capable of carrying out the normal intended commutation function in order that power may continuously flow from the direct current circuit to the alternating current circuit through the inverter units. This relationship may be stated in another way. The desired performance of the inverter may be accomplished by assuring at all times an adequate alternating current voltage in the output circuits of the inverters to effect the desired commutation between the various electric valve means. The synchronous condenser connected to the alternating current output circuit, or circuits, of the inverter units supplies the commutating voltage which is so essential to the proper operation of the system both under steady state conditions and under transient disturbances.

Figs. 2a and 2b together diagrammatically illustrate a direct current system for transmitting power between constant voltage alternating current circuits 115 and 116 through a direct current transmission line 117. The system shown in Figs. 2a and 2b is capable of transmitting power in either direction between the constant voltage alternating current circuits 115 and 116, but for the purpose of explaining the invention the translating apparatus associated with circuit 115 will be considered as the transmitting station and the apparatus associated with the circuit 116 will be considered as the receiving station. A plurality of electric valve rectifying circuits 118 and 119 are connected in series relation with each other and are connected to transmit direct current to circuit 117. Each of the rectifying circuits 117 and 118 is provided with a plurality of electric valve means 120, which are preferably of the type employing an ionizable medium and each of which comprises an anode 121, a cathode 122 and a control member or grid 123. Connected between the alternating current circuit 115 and the electric valve rectifiers 118 and 119, I provide a transformer 124 having a plurality of primary windings 125 and two groups of secondary windings 126 and 127 which energize separate alternating current circuits 128 and 129, respectively.

To control the conductivity of the electric valves 120, I provide a plurality of excitation circuits 130. Only one of the excitation circuits 130 in rectifying circuits 118 and 119 is shown in detail. It is to be understood that the other circuits are arranged in substantially the same manner. Each of the circuits 130 includes a transformer 131, a source of negative unidirectional biasing potential such as a battery 132, and a condenser 133 which is connected between the cathode 122 and the grid or control member 123 of the associated electric valve 120. In order to control the conductivity of the electric valves 120 to transmit power at a substantially constant voltage within a predetermined range of power transfer and to effect a predetermined variation in the output characteristics of the valves to transmit power at substantially constant kilowatts when the load tends to exceed a predetermined value, I provide a transformer 134 having primary windings 135 connected in series relation with the circuit 128 and having secondary windings 136. The secondary windings 136 are provided with a plurality of taps 137 to adjust the magnitude of the control voltage obtained from circuit 128. Transformer 134 operates essentially as a current transformer to provide a control voltage of predetermined phase and of a magnitude which varies in accordance with the current transmitted by the associated circuit. The control voltage derived from the transformer 134 is introduced into excitation circuit 130 by means of a suitable impedance such as a resistance 138. The variable control voltage derived from transformer 134 is combined with an alternating voltage of predetermined phase and magnitude by means of a transformer 139 having primary windings 140 and secondary windings 141 and 142. The phase of the voltage introduced into excitation circuit by transformer 139 may be adjusted by means of a suitable phase shifting device, such as a rotary phase shifter 143. The rotary phase shifters 143 associated with the electric valve rectifiers 118 and 119 may be mechanically coupled, if desired. Adjustment of the rotary phase shifter 143 determines the value of power at which the transition from constant voltage to constant kilowatt operation takes place.

At the receiving station I provide a plurality of groups of serially connected electric valve inverters 144 and 145, each of which comprises a plurality of electric valve means 146 which are preferably of the type employing an ionizable medium. Each of the electric valves 146 comprises a control grid 147. The electric valve inverters 144 and 145 operate to transform direct current into alternating current and energize circuits 148 and 149, respectively. A transformer 150 is connected between circuits 148 and 149 and circuit 116 and comprises primary windings 151 and 152 and secondary windings 153. A plurality of suitable excitation circuits 154 are associated with each of the electric valves 146 to control these electric valves for inverter operation, and each may comprise a transformer 155, a suitable source of negative unidirectional biasing potential such as a battery 156, and a capacitance 157 for absorbing voltages which may be present in the control circuits. The amount of power transmitted to the alternating current circuit 116 is controlled by excitation circuits 154 which in turn are controlled by suitable phase shifting devices, such as rotary phase shifters 158 and associated transformers 159. Adjustment of the rotary phase shifters 158 controls the amount of power transmitted to circuit 116.

The voltage and frequency of the alternating current circuit 116 may be controlled by an arrangement such as that disclosed above in connection with Figs. 1a–1d. More specifically, I may employ the synchronous dynamo-electric machine 99 and a control or load compensating device such as the device 105 described above in connection with Figs. 1a–1d.

The amount of power transmitted to the alternating current circuit 116 may be controlled by means of a suitable frequency responsive means 160 which controls the phase of the voltage impressed on the control grids 147 of electric valve inverters 144 and 145. The frequency responsive means 160, acting in conjunction with the synchronous machine 99, operates to transmit variable amounts of power to the alternating current circuit 116 at substantially constant voltage and frequency.

The embodiment of my invention shown in Figs. 2a and 2b operates to transmit power from the alternating current circuit 115 to the alternating current circuit 116 at substantially constant voltage for a predetermined range of power transfer and transmits power at approximately constant kilowatts when the power tends to exceed a predetermined value. This characteristic is obtained by the adjustment of the rotary phase shifters 143 at the transmitting station.

Prior to a consideration of the operation of the entire system, the operation of the individual excitation circuits 130 will be considered. Fig. 2c illustrates an operating characteristic of one of the electric valves 120 and the associated excitation circuit 130. Curve A represents the polar vector diagram of an electric valve of the type employing an ionizable medium for various angular displacements between the anode-cathode voltages and the grid voltages. Vector OB represents the voltage introduced into the excitation circuit 130 by means of transformer 139, more particularly secondary winding 142, and vectors BC and BC' represent the voltage introduced into the excitation circuit 130 by means of transformer 134 and resistance 138. Of course, it is to be understood that the magnitude of the vector BC varies in accordance with the load transmitted by the associated alternating current circuit 128 or in accordance with the current transmitted by the associated rectifying circuit 118. It will be noted that the resultant vector OC which is impressed on the control grids 123 varies in phase with respect to the anode-cathode voltage represented by a vector lying along OC. So long as the resultant voltage represented by vector OC leads the anode-cathode voltage, the electric valves transmit power at constant voltage to circuit 117. But upon increase of the load current to a value sufficient to retard the resultant grid voltage to a lagging position, such as that represented by the vector OC', the output voltages of the electric valves 120 and hence the voltages of the rectifying circuits 118 and 119 are decreased in accordance with the polar diagram. It will be appreciated that the rectifying circuits 118 and 119 transmit power at substantially constant voltage until the current or the load exceeds a predetermined value at which point the rectifying circuits begin to transmit power in accordance with a different characteristic which simulates a constant kilowatt characteristic. Adjustment of the rotary phase shifters 143 permits control of the value of power at which the transition from the constant voltage characteristic to the constant kilowatt characteristic occurs.

Fig. 2d diagrammatically illustrates the output characteristic of the transmitter station. Curve E represents the constant voltage output characteristic and curves F, G, H and J represent the modified output characteristic when the load tends to exceed a predetermined value. Points K, L, M, and N represent the values of load current at which the transition occurs between the constant voltage output characteristic and the constant kilowatt or power output characteristic. Selection of these points or intermediate points, of course, may be obtained by positioning of the rotary phase shifters 143.

The receiving station transforms the direct current into alternating current of substantially constant voltage within predetermined ranges of power transfer. Upon application of load, the frequency responsive means 160 operates the rotary phase shifters 158 to cause the electric valve inverters to transmit a larger amount of power. The synchronous dynamo-electric machine 99 serves to restore the voltage and frequency to the predetermined desired values.

Figs. 3a–3b, considered jointly, diagrammatically illustrate another embodiment of my invention as applied to a high voltage direct current transmission system. In the arrangements shown in Figs. 3a–3b, electric power is transmitted at different predetermined values of current over the direct current transmission line 161. The value of the direct current which is maintained in the circuit 161 may be controlled or adjusted in accordance with load requirements. The system shown in Figs. 3a–3b may be defined as a variable current-level direct current transmission system. In this arrangement, the transmitting and receiving units are connected in series relation. At the transmitting station serially connected rectifying electric valve apparatus 162—165 are connected in series relation with each other. Each of the rectifying apparatus 162—165 comprises an electric valve rectifier each including a plurality of electric valves 166 and each valve being provided with a control grid 167 for controlling the conductivity thereof. The electric valve rectifiers 162—165 each include direct current terminals 168 and 169 which are connected to the direct current circuit 161. An alternating current circuit 170 energizes the electric valve rectifiers 162—165 through transformers 171—174 and through switches 175—178, respectively. The air core inductive reactances 179 may be connected in series relation with the electric valve rectifiers 162—165 to act as current smoothing reactances. The alternating current circuit 170 may be energized by means of a synchronous dynamo-electric machine 180 having an armature 181 and a field winding 182. A switch 180′ may be connected between the circuit 170 and machine 180.

As a means for controlling the excitation of the dynamo-electric machine 180 to maintain different predetermined current levels in the direct current circuit 161, I provide a suitable current regulator 183 which may be a conventional arrangement well known in the art, and for the purposes of illustration I have represented it as comprising an exciter 184 having an armature 185 and a field winding 186, a sub-exciter 187 having an armature 188 and a field winding 189, and a vibratory contact regulator 190 having an actuating winding 191 and an anti-hunting coil 192 which is energized in accordance with the armature voltage of the sub-exciter 187. The actuating coil 191 of the regulator 190 may be energized in accordance with a predetermined electrical condition which varies as the current of the direct current circuit 161. For example, I connect a suitable shunt 193 in series relation with the direct current circuit 161, and the voltage appearing across the shunt 193 is impressed across the terminals of the coil 191.

As an agency for selecting the current level at which power is transmitted over the direct current circuit 161 and for controlling the current level in accordance with the power demanded by the transmission system, I provide a regulator circuit 194 which may include a wattmeter 195 having direct current terminals 196 connected to be energized in accordance with the current transmitted by circuit 161 and terminals 196′ energized in accordance with the potential of the direct current circuit 161. The terminals 197 may be energized through associated apparatus (not shown) connected to the direct current circuit 161 to effect a desired reduction in the value of the voltage applied to the wattmeter 195. The wattmeter 195 is provided with a movable member or contact 197 which engages contacts 198—201, each of which represents a predetermined range of power transfer. Relays 202—205 are controlled by the wattmeter 195 and control the effective value of the shunt 193 which is connected in series with the circuit 161. The relays 202—205 may be energized from a suitable source of current, such as a battery 206, through a switch 207. The relays 202—205 control the current level which is maintained in the direct current circuit 161 in accordance with the power transmitted by the system.

I provide means for selectively connecting and disconnecting the electric valve rectifying circuits 162—164 to the direct current circuit 161 in accordance with the power demanded by the system. More specifically, I provide contactors 208, 209 and 210 which are associated with the direct current terminals 168 and 169 of electric valve rectifiers 162—164, respectively, and which connect and disconnect the rectifiers to the circuit 161 in response to the power transmitted by the system. The electric valve rectifiers 162—164 may be arranged to be connected and disconnected in any predetermined order to satisfy load requirements. One way in which the rectifiers 162—164 may be connected is that in which the rectifiers 162—164 are connected in sequence and are disconnected in the reverse order. Contactors 208—210 are arranged to short circuit the direct current terminals in the order named and to open circuit the terminals in the reverse order. Contactors 208—210 are provided with relays 211—213, respectively, which control the energization of the actuating coils for contactors 208—210 so that this sequence is followed. Time delay relays 214 may be connected in series relation with the actuating coils of contactors 209 and 210 and relays 212 and 213 to prevent hunting between the control circuits and to prevent simultaneous operation of contactors 208—210. Only one of the time delay relays 214 is shown in detail. It is to be understood that any suitable time delay arrangement may be used.

A relay 215 is provided to control the energization of contactors 208—210 and relays 211—213 to effect connection and disconnection of the rectifiers 162—164 in response to a predetermined controlling influence which varies as the power transmitted by the system. The relay 215 may be of the contact-making voltmeter type having an actuating coil 216 and contacts 217 and 218. Armature member 219 is spring biased against a predetermined pull of coil 216 to the intermediate position. The relay 215 may be energized in accordance with the armature voltage of the sub-exciter 187 to control the number of rectifiers effectively connected to the direct current circuit 161. The armature voltage of the sub-exciter 187 varies in accordance with the power transmitted by the system and may be employed to effect this selective operation of the contactors 208—210. When contacts 218 of the relay 215 are closed, indicating a decrease in the power transmitted by the system, one of the contactors of contactors 208—210 is operated to shunt the direct current terminals of the associated rectifiers 162—164, and when the contacts 217 are closed, one of the contactors 208—210 is operated to connect the associated rectifiers to the direct current circuit 161. Of course, upon sudden decreases and increases of load, it is to be understood that two or three of the rectifiers may be controlled in rapid succession in order to meet the load requirements.

In order to protect individual rectifiers 162—164 from overload, I employ a circuit 220 which may be of the type discussed above in connection with Figs. 2a and 2b. Upon overload, the phase of the voltages impressed on the control grids 167 is retarded to decrease the amount of current transmitted irrespective of the control indicated by the other associated control apparatus. The circuit 220 is energized from a plurality of current transformers 221 and includes a transformer 222 having primary windings 223 and secondary windings 224 which introduce into circuit 220, by means of resistances 225, voltages which vary in magnitude in accordance with the current transmitted by the alternating current circuit 170. A voltage of predetermined phase and of constant magnitude is also introduced into the circuit 220 by means of a transformer having primary windings 226 and secondary windings 227. The phase of the voltage of constant magnitude may be adjusted by any suitable arrangement such as a rotary phase shifter 228. It is to be understood that rectifiers 163—165 may also be provided with current limiting or controlling circuits 220.

At the receiving station I provide a plurality of serially connected electric valve inverters 229—232, inclusive, each of which comprises a plurality of electric valve means 233 which are preferably of the type employing an ionizable medium and having a control member or grid 233'. The electric valve inverters 229—232 are arranged to be selectively connected in operative relation for the transfer of power by means of contactors 234—236 and control relays therefor 237—239, respectively. Power is transmitted from the direct current circuit 161 to an alternating current load circuit 240 through the electric valve inverters 229—232. The electric valve translating system connected at the receiving station functions to transmit power at substantially constant voltage to the alternating current circuit 240 irrespective of the current level at which power is transmitted over the direct current circuit 161. The amount of power transmitted to circuit 240 is controlled by the number of inverting units 229—232 which are connected in operative relation. As a means for controlling the power, voltage and frequency of the alternating current circuit 240 within the ranges of power transfer determined by the number of inverter units connected to circuit 161, I provide an auxiliary or supplementary electric valve circuit 241 which is capable of operating either as a rectifier or as an inverter for the transmission of power between the direct current circuit 161 and the alternating current circuit 240. The electric valve circuit 241 comprises a plurality of electric valve means 242 which may also be of the type employing an ionizable medium, such as a gas or a vapor, and each comprises a control grid 243 which controls the conductivity of the electric valves and also determines the operation of the circuit as a whole.

I provide inductive networks, such as transformers 244 and 245, which are connected between electric valve inverters 229, 230 and 231, 232, respectively, and the alternating current circuit 240. The electric valve inverters control the resultant ampere-turns or the resultant magnetic field of the transformers and thereby control the power transfer between circuits 161 and 240. Transformer 244 is provided with a plurality of primary windings 246 and 247 which are connected to electric valve inverters 229 and 230 through switches 248 and 249, respectively. Transformer 244 is also provided with a secondary winding 250 which is connected to the alternating current circuit 240. Likewise transformer 245 is provided with a plurality of primary windings 251 and 252 which are associated with electric valve inverters 231 and 232 through switches 253 and 254, respectively. Transformers 244, 245 may be connected in a twenty-four phase system in a manner similar to transformers 25 and 26 of Figs. 1a—1d. That is, each of transformers 244, 245 may provide a six-phase system of voltages displaced in phase from each of the other six-phase systems of the other transformers. Transformer 245 is also provided with a secondary winding 255 connected to the alternating current circuit 240. A transformer 256 and a switch 257 may be connected between the auxiliary electric valve circuit 241 and circuit 240. In addition, a transformer 258 and a suitable switch 259 may be connected in the alternating current circuit 240 to disconnect the load from the electric valve circuits 229—232 and circuit 240.

The electric valves 233 of the inverters 229—232 operate as inverters and are controlled by means of a plurality of control circuits. Only one of the control circuits associated with an electric valve in inverter circuit 232 is shown. It is to be understood that these circuits are similar in construction and arrangement and operate to control the electric valve inverters to transform direct current into alternating current. By way of example, I may employ a circuit 260 which is similar in many respects to control circuit 33 described above in connection with Figs. 1a—1d. Corresponding elements have been assigned like reference numerals. The transformer 38 may be energized from a suitable source of alternating voltage 261 through any suitable phase shifting arrangement, such as a rotary phase shifter 262. It is to be understood that the other electric valves in the inverter group 232 are energized from the output circuit of the rotary phase shifter 262. Furthermore, it is to be noted that each of the other inverter circuits 229—231 may also be provided with similar excitation systems to control the amount of power transmitted by the respective inverter circuits. The rotary phase shifters 262 can be operated severally or jointly.

I provide a dynamo-electric machine 263 of the synchronous type for controlling the voltage of the alternating current circuit 240 within narrowly defined limits. The machine 263 may comprise an armature 264 and a field winding 265 which is energized from any conventional system such as a voltage regulator 266 comprising an exciter 267, a sub-exciter 268, a resistance 269 which is intermittently shunted by means of contacts 270 to control the excitation of the sub-exciter and hence the excitation of the exciter and field winding 265, and an alternating current actuating coil 271 and an anti-hunting coil 272. It is to be understood that I may employ any other conventional arrangement well known in the art for controlling the energization of the field winding 265 in accordance with a predetermined controlling influence such as the voltage of circuit 240.

I provide a frequency responsive circuit 273 which controls the auxiliary electric valve circuit 241 and also controls the number of inverter circuits which are connected in operative relation for the transfer of power between circuits 161 and 240. The circuit 273 also, of course, controls the voltage within certain limits. Circuit 273 may comprise a transformer 274, a suitable phase shifting arrangement such as a rotary phase shifter 275 and a transformer 276 connected between the rotary phase shifter 275 and the grid circuits for electric valves 242 in circuit 241. In addition, the rotary phase shifter 275 is provided with a movable contact 277 and stationary contacts 278 and 279 which in the extreme positions of movement of the contact 277 control relays 237—239 and contactors 234—236 to control the number of inverters operatively connected in the system. Of course, the rotary phase shifter 275 controls the amount of power transmitted to circuit 240 and hence controls the voltage and frequency of circuit 240.

To control the position of the rotary phase shifter 275, I employ any suitable arrangement such as a reversible motor 280 having field windings 281 and an armature 282 and a relay 283 having an actuating coil 284. The position of the movable element of the rotary phase shifter 275 and hence the phase of the voltage impressed on the control grids 243 of valves 244 is controlled by means of a frequency sensitive network 285 which may comprise a resonant circuit including a capacitance 286 and an inductance 287. The resonant circuit may be energized through a transformer 288. Variable amounts of current are transmitted to the actuating coil 284 from circuit 240 by means of a full wave rectifier 289 and a serially connected saturable inductive reactance 290 which is controlled by means of a rectifier 291 which is energized in accordance with the voltage appearing along the inductance 287 in the resonant circuit. The resonant circuit may be tuned to a frequency slightly greater than the frequency which is to be maintained so that as the frequency varies from the predetermined value to be maintained, the energization of coil 284 is varied to effect movement of the rotary phase shifter 275 in the proper direction.

Prior to the explanation of the manner in which the embodiment of my invention shown in Figs. 3a–3b operates, it is emphasized that the system there disclosed permits transfer of power over a direct current transmission circuit at different predetermined current levels. While the system is operating within these current levels, the current throughout the system is maintained at a substantially constant value, and the variations in power demands are met by variations in the value of the voltage of the direct current circuit. In addition, it is emphasized that the value of current maintained in the direct current circuit may be adjusted or controlled, either automatically or manually, to control the current level at which power is transmitted in order that the power losses of the associated equipment may be reduced substantially when the power demanded is not large. Furthermore, the current level may be substantially increased to meet the power demands when the power required by the system is relatively large.

For every current level at which power is transmitted over the direct current circuit 161, the dynamo-electric machine 180 maintains a corresponding alternating current of constant value in circuit 170, and the electric valve rectifiers 162—165 transform the alternating current of constant value into direct current of constant value. The electric valve inverters 229—232 at the receiving station transform the direct current of constant value into alternating current of constant value. These inverters transmit alternating current of constant value to the primary windings of transformers 244 and 245 and control the resultant magnetic field of these transformers so that power is transmitted to circuit 240 at substantially constant voltage. Of course, the dynamo-electric machine 263 and the auxiliary electric valve circuit 241 also operate to control voltage within certain regions.

In explaining the operation of the system under varying power demands, the transmitting station will be considered first. The transmitting station is arranged to satisfy the power demanded by the system and is arranged to transmit power at different predetermined current levels in order to maintain the power losses at a relatively low value over a wide range of load. Of course, such control maintains the efficiency of the system at high values irrespective of the amount of power being transmitted. Let it be assumed that the power demanded by the system is relatively small and that only electric valve rectifier 165 is required to supply power to the direct current circuit 161. Circuit 194 operates in response to the power to control the current level at which power is transmitted and for the particular value of power being delivered, the movable contact member 197 of wattmeter 195 may be assumed to be in the position indicated. The current regulator 183 controls the excitation of the dynamo-electric machine 180 to maintain constant current in circuit 170 and the electric valve rectifier 165 transforms the alternating current of constant value into direct current of constant value. The voltage appearing across the shunt 193 controls the energization of coil 191 of regulator 183 to effect this result. It will be understood that within the predetermined range of power established by the circuit 194, power is transmitted at a constant current level and the variations of power within this range are met by changes in the value of the output voltage of rectifier 165, or, in other words, changes in the direct current voltage of circuit 161. Under this condition of operation where only electric valve rectifier 165 is in operative relation, it is understood that rectifiers 162—164 are controlled by means of contactors 208—210 which shunt the direct current terminals of the rectifiers.

If it be assumed that the power demanded by the system increases beyond the amount of power which may be supplied by rectifier 165, electric valve rectifier 162 will be connected in circuit by operation of the contactor 208 which in turn is controlled by relay 211 and the relay 215. Relay 215 is controlled in response to the power transfer and is directly responsive to the armature voltage of the sub-exciter 187. Within this range of power transfer, electric valve rectifiers 162 and 165 transmit power at the predetermined current level established by circuit 194. The variations in power are met by variations in the value of the voltage impressed on circuit 161. In like manner, upon further increases of load, rectifiers 163 and 164 are successively connected in operative relation so that all of the rectifying units transmit power to circuit 161 at substantially constant current and variable voltage.

If it be further assumed that the power demand increases beyond that amount which the rectifiers 162—165 are able to furnish at this predetermined current level, wattmeter 195 operates so that contact 197 engages contact 198, operating relay 205. Relay 205 changes the effective value of the shunt 193 so that a higher value of current is maintained in circuit 161. Relay 215 controls contactors 208—210 through relays 211—213 to connect to the direct current circuit 161 that number of rectifying units required to satisfy the power demands at that current level. The rectifiers 162—164 are connected successively to circuit 161 in the order named and upon decrease in power within that range, the electric valve rectifiers 164 are successively operated in the reverse order. It is to be understood that my invention may be carried out without confining the connection and disconnection of units to the particular order illustrated. In like manner, upon further application of load to the system, the wattmeter 195 successively operates to energize relays 204, 203 and 202 to effect an increase in the current level at which power is transmitted over the direct current circuit 161, and the relay 215 controls the rectifiers 162—164 to connect to circuit 161 the number of rectifying units required to satisfy the power demands at the various current levels. It is to be understood that the circuit 194, which is responsive to the power demands, establishes the current level at which power is transmitted for predetermined ranges of power transfer, and that the relay 215 controls the number of rectifying units connected to circuit 161 and hence controls the ranges of voltage variation of circuit 161. Within the particular voltage ranges established by the rectifiers 162—164, the voltage variation of circuit 161 is effective, by means of the current regulator 183 which controls the dynamo-electric machine 180, to transmit power to circuit 170 in the form of alternating current of constant value but of variable voltage. The variation of power is effected in a smooth and precise manner over a wide range of power demands.

For the purpose of explaining the operation of the transmitting station more specifically, let it be assumed that the system is arranged to effect transfer of power over the direct current circuit 161 at current levels of 20, 40, 60, 80 and 100 amperes, and that the maximum output voltage of each of the electric valve rectifiers 161—155 is 10,000 volts. Consequently, the voltage impressed on the direct current circuit 161 may range from zero to 40,000 volts. Within the 20 ampere level, the power transmitted to the circuit 161 may be varied from zero to 800 kilowatts, depending upon the number of units connected. For the 40 ampere level, the power delivered to the circuit 161 may be varied throughout a range from zero to 1,600 kilowatts. Likewise, for the 60, 80 and 100 ampere current levels, the power delivered to circuit 161 may be varied from zero to 2400, from zero to 3200 and from zero to 4000 kilowatts, respectively. The circuit 194 upon application of load controls the system to select the current level, and relay 215 controls the number of rectifying units connected.

Circuit 220 operates to limit the value of current transmitted by the electric valve rectifiers 162—165 by retarding the phase of the voltage impressed on the control grids 167 if the current tends to exceed a predetermined value established by the phase relationship of the voltages introduced into circuit 220.

At the receiving station, the translating apparatus transforms the direct current into alternating current of constant voltage, irrespective of the current level at which power is transmitted over circuit 161. If it be assumed that the amount of power transmitted is relatively small so that only inverter circuit 232 is effectively connected to circuit 240, the power will be transmitted to circuit 240 through circuit 232 and the auxiliary electric valve circuit 241. Inverters 229—231 will be rendered inoperative by contactors 234—236, respectively. The amount of power transmitted may be controlled by adjustment of the excitation circuits 260 or by operation of the rotary phase shifter 275 which, in turn, is controlled by the frequency responsive circuit 273. Within a predetermined range of power transfer, the auxiliary circuit 241 supplies power to or absorbs power from circuit 240, so that the system satisfies the load demands. That is, the electric valve inverter 232 transmits a substantially fixed amount of power to circuit 240 and the auxiliary circuit 241 absorbs or delivers the difference of power established by the load. The electric valve circuit 241 is capable of operating either as a rectifier or as an inverter to transfer power between the direct current circuit 161 and the alternating current circuit 240. For example, if the amount of power transmitted by circuit 240 is in excess of that supplied by inverter 232 but not sufficient to require the connection of additional inverters, the auxiliary circuit 241 operates as an inverter to transmit power from circuit 161 to circuit 240. On the other hand, if the amount of power transmitted by inverter 232 exceeds the amount of power demanded by circuit 240, the auxiliary circuit 241 operates as a rectifier to transmit power from circuit 240 to the direct current circuit 161. The frequency responsive circuit 273 controls the phase of the voltages impressed on the control grids 243 of electric valves 242 to effect this selective control between inverter and rectifier operation of circuit 241. However, if the power demanded by the circuit 240 increases to a predetermined value, the movable member of the rotary phase shifter 275 is moved to the position in which movable contact 277 engages contact 278 to connect an additional inverter unit in the system. Contactors 234—236 and the associated relays 237—239, respectively, operate to connect inverters 229—231 in the system in the order named until the connected apparatus is sufficient to supply the load demanded by circuit 240. From the above explanation, it will be understood that the frequency responsive circuit 273 operates to connect the required number of inverter units in the system to determine ranges of power transfer, and that the auxiliary circuit 241 controls the amount of power within the ranges established by the number of inverter units connected. Upon decrease of load with a definite number of inverter units connected, one or more of the inverters may be shunted by the contactors 234—236 to decrease the amount of power transmitted. Since the circuit 273 is responsive to the frequency of the alternating current circuit 240 and hence responsive to the power transmitted, the system operates to transmit power to the load circuit 240 irrespective of the current level at which power is transmitted over the direct current circuit 161.

Referring now to the manner in which the electric valve inverters 229—232 operate in connection with the associated transformers 244 and 245 to transmit power to circuit 240 at substantially constant voltage, it is to be understood that since the inverters 229—232 transmit substantially constant current for each current level to the associated primary windings 246, 247, 251 and 252, this arrangement controls the resultant magnetic field associated with the secondary windings 250 and 255. That is, the electric valve inverters 229—232 control the voltage of circuit 240 to maintain the voltage thereof substantially constant by the selective energization of the primary windings 246, 247, 251 and 252 by transmitting thereto alternating currents of constant value.

Variable amounts of power are transmitted to circuit 240 by controlling the number of phases of transformers 244 and 245 which are connected operatively in the system. In other words, the amount of power transmitted may be controlled by controlling the number of polyphase systems of voltages which are operatively connected in the circuit. Transformers 244 and 245 provide a twenty-four phase system which is composed of four six-phase systems. The receiving station may operate as a six, twelve, eighteen or twenty-four-phase system, depending upon the number of inverter circuits connected, and the amount of power may be controlled accordingly.

The dynamo-electric machine 263, which may operate as a synchronous condenser, serves to control the voltage of circuit 240 to maintain the voltage thereof substantially constant by supplying variable amounts of reactive volt-amperes to maintain the voltage within narrowly defined limits. The voltage regulator 266 operates in response to changes of voltage of circuit 240 to control the energization of field winding 265.

Fig. 4 diagrammatically illustrates certain operating characteristics of the system shown in Figs. 3a-3b. Curves P, Q, R, S and T represent the constant current levels at which power may be transmitted over the circuit 161, and the line U represents the maximum voltage of circuit 161. The area of the regions described, of course, represents the amount of power transmitted for the various levels.

While the embodiment of my invention shown in Figs. 3a-3b has been discussed as applied to a system in which an alternating current of constant value is supplied to the electric valve rectifiers 162—165, it is to be understood that the system may be operated in an arrangement in which an alternating current of constant voltage is supplied to circuit 170. In that case the regulator 183 would be connected to control the excitation of the field in response to the voltage of circuit 170 to maintain the voltage substantially constant. In addition, the actuating coil 216 of relay 215 would be energized in accordance with the voltage appearing across the shunt 193 to connect the electric valve rectifiers 162—164 to circuit 161 in response to the current transmitted. Of course, in an arrangement of this nature, the current level would not be maintained absolutely constant but the selective connection and disconnection of the rectifying units 162—164 would serve to maintain the current within a predetermined range of values to meet varying power demands. The regulator 183, of course, could be energized in response to the voltage of circuit 170 by connecting the actuating coil 191 to be energized from circuit 170, in which case an alternating current of constant voltage would be supplied to circuit 170 by machine 180. When the system is operating in that manner, the inverting units 229—231 at the receiving station would be operated by the frequency responsive circuit 273 to transmit variable amounts of power from the direct current circuit 161 to the alternating current circuit 240. The auxiliary circuit 241 would operate in substantially the same manner as that explained above to transmit power to or absorb power from the alternating current circuit 240, depending upon the particular load requirements.

Fig. 5 diagrammatically illustrates an electric power transmission system of the type discussed above in connection with Figs. 3a-3b. The system may be arranged to transmit power from a plurality of transmitting stations 292 and 293 to a plurality of receiving stations 294—299, inclusive. The receiving stations and the transmitting stations may be placed or isolated at will throughout the system, depending upon the relative locations of the power sources and distribution centers. Power is transmitted over the direct circuit 161 at predetermined different current levels. The transmitting stations 292 and 293 may each comprise arrangements, as shown in Figs. 3a-3b, such as a plurality of serially connected electric valve rectifiers 162—165. The transmitting stations 292 and 293 may be energized from alternating current circuits 300 and 301, respectively, which may be either constant current alternating current circuits or constant voltage alternating current circuits. The selective connection of the rectifying units 162—165 at stations 292 and 293 may be controlled by switching or contactor apparatus, such as contactors 208—210 shown in Figs. 3a-3b. The receiving stations 294—299 may be connected to energize individually a plurality of constant voltage alternating current circuits 302—307. Each of the receiving stations 294—299 may be equipped with apparatus such as that shown in connection with the receiving station in the arrangement of Figs. 3a-3b.

The electric power transmission system diagrammatically illustrated in Fig. 5 operates in substantially the same manner as that explained above in connection with Figs. 3a-3b. Any number of receiving and transmitting stations may be connected to the system and the amount of power which each station transmits or receives may be controlled with great flexibility. The system operates at relatively high efficiency inasmuch as the current level of the current transmitted in circuit 161 may be controlled or adjusted in response to the system power demands.

Fig. 6 diagrammatically illustrates another embodiment of my invention in which power is transmitted over a high voltage, direct current transmission line 308 from an alternating current circuit 309 to an alternating current load circuit 310 and in which the voltage and frequency of circuit 310 are maintained at predetermined values. The system of Fig. 6 is highly satisfactory for the transmission of power in "stub-end feed" arrangements in which energization of an isolated alternating current load circuit is effected. The alternating current supply circuit 309 may be energized from a suitable source of power, such as a dynamo-electric machine 311, which may be of the synchronous type having an armature member 312 and a field winding 313. The field winding 313 may be variably energized from a suitable source of direct current 314 through resistance 315 and a suitable current controlling device, such as a carbon pile rheostat having an actuating winding 317. The alternating current of circuit 309 is rectified by means of an electric valve rectifier 318 comprising a plurality of electric valve means 319 which are preferably of the type employing an ionizable medium, such as a gas or a vapor, and a transformer 320 may be interposed between the circuit 309 and the rectifier 318. At the receiving station, an electric valve inverter 321 transforms the direct current into alternating current and comprises a plurality of electric valve means 322 each having a control grid 323. Since the electric valve inverter 321 transforms direct current into alternating current, it is necessary to energize the control grids 323 to effect the desired operation of the circuit, and I may employ excitation circuits, such as circuit 260 shown in Figs. 3a-3b, to effect this type of operation. Of course, it is to be understood that I may employ any other suitable excitation circuit well known in the art. Transformer 324 is connected between the electric valve inverter 321 and the alternating current load circuit 310.

As a means for controlling the voltage and the frequency of the alternating current load circuit 310, I provide a dynamo-electric machine 325 which is of the synchronous type having an armature member 326 and a field winding 327. I have found that in systems of this nature in order to maintain the voltage and frequency within predetermined ranges of values, it is necessary to control the energization of the field winding 327 and hence the excitation of the machine 325 in accordance with the load being transmitted by the system. I supply a substantially constant component of current to the field winding 327 from a suitable source of direct current 328 through a current controlling resistance 329, and I supply a variable component of current to the field winding 327 through a rectifying circuit 330 comprising a transformer 331 and an electric valve 332. The rectifying circuit 330 is energized from a current transformer 333 and a resistance 334 is connected across the secondary of the current transformer to limit the voltage thereof.

As a means for initiating the operation of the system, I provide a direct current starting motor 335 having an armature 336 and a field winding 337. The armature 336 is mechanically coupled to the rotating member of machine 325 and is connected electrically to be energized by the direct current transmitted by the direct current circuit 308 during the initiating operation. The armature 336 may be connected to circuit 308 through a switch 338 and the circuit therefore may be connected across the terminals of a switch 339.

I have found that in systems of this nature stable operation of the system may be effected by controlling the magnitude of the voltage of the direct current circuit 308 in response to the frequency of the alternating current load circuit 310. In order to effect this type of control, I provide a frequency responsive circuit 340 which may be energized in accordance with the frequency of the load circuit 310 through an auxiliary control circuit 341. The frequency responsive circuit 340 may comprise a resonant circuit including a capacitance 342, an inductance 343, a resistance 344 and may be energized from circuit 341 through a transformer 345. A predetermined component of voltage appearing across the inductance 343 may be rectified and supplied to the winding 317 of the carbon pile regulator 316 through a full wave rectifier 346 and a current controlling resistance 347. It is to be understood that while I have shown a particular arrangement for effecting control of the voltage of direct current circuit 308 in response to the frequency of the load circuit 310, it will be apparent to those skilled in the art that I may employ any other suitable frequency responsive means.

The operation of the embodiment of my invention shown in Fig. 6 will be considered under the conditions when it is required to transmit power from circuit 309 to the alternating current load circuit 310. The system operates to transmit power and to maintain the system stable by varying the value of the voltage of the direct current circuit 308. The magnitude of the voltage of the direct current circuit 308 is varied in response to the frequency of circuit 310. For example, upon application of load to the circuit 310 there will be a temporary or transient reduction in frequency which, operating through the frequency responsive circuit 340, changes the energization of actuating coil 317 to increase the excitation of the dynamo-electric machine 311, thereby increasing the value of the voltage of circuit 308 and tending to increase the amount of power transmitted to circuit 310.

The dynamo-electric machine 325 at the receiving stations controls the voltage and the frequency of the alternating current load circuit 310. Were it not for the increased excitation of the machine 325 upon increase of load, the resultant field of the machine 325 would be decreased and the frequency of the system would tend to increase. However, since the rectifier 330 increases the excitation of the field winding 327, the frequency of the dynamo-electric machine 325 and the voltage are maintained within narrowly defined ranges of values. The system shown in Fig. 6 operates to transmit variable amounts of power to circuit 310 at substantially constant voltage and frequency.

The system may be initiated in operation by effecting energization of the armature 336 of the starting motor 335 by closing switch 338 and opening switch 339. The voltage of the dynamo-electric machine 311 at the transmitting station is gradually increased and the electric valve inverter circuit 321 during this initiating operation operates as a rectifier so that unidirectional current is transmitted from the rectifier 318, through the inverter 321 and through the armature 336 of the starting motor 335. When the speed of the machine 325 is raised to a predetermined value, the field winding 327 is energized and the machine begins operating as a synchronous motor or synchronous condenser. When so operating, it produces an alternating voltage across its terminals and hence supplies to the circuit 310 an alternating voltage which impressed on the electric valves 323 of the circuit 321 causes that group of valves to operate as inverters. Upon such operation, the switch 339 may be closed and the switch 338 may be opened. The machine 325 then supplies reactive power to the circuit 310 and the system operates to transmit power from circuit 308 to circuit 310.

Fig. 7 diagrammatically illustrates a modification of the embodiment of my invention shown in Fig. 6 and corresponding elements have been assigned like reference numerals. Instead of employing a separate control circuit 341 for transmitting a signal which varies as the frequency of the alternating current in the circuit 310 in the arrangement of Fig. 7, the signal may be superimposed on the direct current of the circuit 308 through transformers 348 and 349. The signal is derived at the transmitting station by means of a transformer 350 and is transmitted to the frequency responsive circuit 340 to control the operation of the rheostat 316. The system of Fig. 7 operates in substantially the same manner as that explained above in connection with Fig. 6.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current circuit, an alternating current load circuit, translating apparatus connected between said direct current circuit and said alternating current load circuit and comprising a plurality of inverters each comprising direct current terminals and being connected in series relation with the other inverters, means for controlling the power level at which power is transmitted by said direct current circuit, and means for controlling the power transmitted to said load circuit.

2. In combination, a direct current circuit, a plurality of load circuits connected to be energized by said direct current circuit and each comprising an electric valve inverter connected in series relation with the direct current terminals of the other inverters, means for controlling the power level at which power is transmitted by said direct current circuit, and means for controlling the power transmitted to said load circuits.

3. In combination, a direct current circuit, a plurality of load circuits connected to be energized by said direct current circuit and each comprising an electric valve inverter connected in series relation with the other inverters, means for controlling the power lever at which power is transmitted by said direct current circuit, and means for controlling said electric valve means to control the power transmitted to said load circuits.

4. In combination, a direct current circuit, a plurality of load circuits connected to be energized by said direct current circuit and each comprising an electric valve inverter connected in series relation with the direct current terminals of the other inverters, means for controlling the power level at which power is transmitted by said direct current circuit, and independent means associated with each of said electric valve means for controlling the power transmitted to the associated load circuit.

5. In combination, a direct current circuit, electric translating apparatus for energizing said circuit, means for controlling the current level at which power is transmitted over said direct current circuit, an alternating current load circuit, translating apparatus connected between said direct current circuit and said load circuit and including means for transforming direct current into alternating current, and means for maintaining the voltage of said load circuit substantially constant independently of the current level at which power is transmitted over said direct current circuit.

6. In combination, a direct current circuit, electric translating apparatus for energizing said direct current circuit, means for controlling said translating apparatus to control the current level at which power is transmitted over said direct current circuit, an alternating current load circuit, electric translating apparatus connected between said direct current circuit and said load circuit and including electric valve means for transforming direct current into alternating current, and means for maintaining the voltage of said load circuit substantially constant independently of the current level at which power is transmitted over said direct current circuit.

7. In combination, a direct current circuit, electric translating apparatus for energizing said direct current circuit, means for controlling the current level at which power is transmitted over said direct current circuit, an alternating current load circuit, translating apparatus connected between said direct current circuit and said load circuit and including electric valve means for transforming direct current into alternating current, said electric valve means being provided with a control member for controlling the conductivity thereof, and means for energizing said control member to maintain the voltage of said load circuit substantially constant independently of the current level at which power is transmitted over said direct current circuit.

8. In combination, a direct current circuit, an alternating current circuit, electric translating apparatus connected between said circuits for transforming alternating current into direct current, means for controlling said translating apparatus to transmit power to said direct current circuit at different predetermined current levels, and means for selecting the current level in accordance with the power transmitted by said translating apparatus.

9. In combination, a direct current circuit, a second circuit for energizing said direct current circuit, a plurality of translating units connected between said circuits and being connected in series relation with each other, means for energizing said second circuit, means for controlling said last mentioned means to transmit power to said direct current circuit at predetermined current levels, and means for selecting the current level.

10. In combination, a direct current circuit, a second circuit for energizing said direct current circuit, a plurality of translating units connected between said circuits and being connected in series relation with each other, means for energizing said second circuit, means for controlling said last mentioned means to transmit power to said direct current circuit at different predetermined current levels, and means for selecting the current level in accordance with the power transmitted by said direct current circuit.

11. In combination, an alternating current circuit, a direct current circuit, electric translating apparatus connected between said circuits for transforming alternating current into direct current, means for controlling the voltage of said alternating current circuit to maintain different predetermined values of current in said direct current circuit, and means responsive to the power transmitted for selecting the value of current which is maintained.

12. In combination, a direct current circuit, a second circuit for energizing said direct current circuit, a plurality of translating units connected between said circuits and being connected in series relation with each other, means for energizing said second circuit, means for maintaining a predetermined value of current in said direct current circuit, and means for controlling the voltage of said second circuit to maintain said value of current.

13. In combination, a direct current circuit, a second circuit for energizing said direct current circuit, a plurality of translating units connected between said circuits and being connected in series relation with each other, means for energizing said second circuit, and means for controlling said last mentioned means in accordance with the power transmitted by said direct current circuit.

14. In combination, a direct current circuit, an alternating current circuit, electric translating apparatus connected between said circuits and comprising a plurality of serially connected units for transforming alternating current into direct current, means for controlling said alternating current circuit to transmit power over said direct current circuit at different predetermined values of current in accordance with the amount of power demanded by the direct current circuit, and means for selectively rendering operative and inoperative said units to control the power supplied to said direct current circuit.

15. In combination, an alternating current supply circuit, a direct current circuit, electric translating apparatus connected between said supply circuit and said direct current circuit and comprising means for transforming alternating current into direct current, means for controlling the current level at which power is transmitted over said direct current circuit, an alternating current load circuit, translating apparatus connected between said direct current circuit and said load circuit and including means for transforming direct current into alternating current, and means for maintaining the voltage of said load circuit substantially constant independently of the current level at which power is transmitted over said direct current circuit.

16. In combination, an alternating current supply circuit, a direct current circuit, electric translating apparatus connected between said supply circuit and said direct current circuit and comprising means for transforming alternating current into direct current, means for controlling the current level at which power is transmitted over said direct current circuit, an alternating current load circuit, translating apparatus connected between said direct current circuit and said alternating current load circuit and including means for transforming direct current into alternating current, and means for maintaining the voltage of said load circuit substantially constant independently of the current level at which power is transmitted over said direct current circuit and independently of the load transmitted.

17. In combination, an alternating current supply circuit, a direct current circuit, electric translating apparatus connected between said supply circuit and said direct current circuit and comprising electric valve means for transforming alternating current into direct current, means for controlling the current level at which power is transmitted over said direct current circuit, an alternating current load circuit, translating apparatus connected between said direct current circuit and said load circuit and including electric valve means for transforming direct current into alternating current, and means for maintaining the voltage of said load circuit substantially constant independently of the current level at which power is transmitted over said direct current circuit.

18. In combination, an alternating current supply circuit, a direct current circuit, electric translating apparatus connected between said supply circuit and said direct current circuit and comprising means for transforming alternating current into direct current, means for controlling the current level at which power is transmitted over said direct current circuit, an alternating current load circuit, translating apparatus connected between said direct current circuit and said load circuit and including electric valve means for transforming direct current into alternating current, said electric valve means being provided with a control member for controlling the conductivity thereof, and means for energizing said control member for controlling the power transmitted to said load circuit.

19. In combination, an alternating current circuit, a direct current circuit, electric translating apparatus connected between said circuits and comprising a plurality of electric circuits for transforming alternating current into direct current, and means for controlling said electric circuits with respect to said direct current circuit to control the current level at which power is transmitted over said direct current circuit.

20. In combination, an alternating current circuit, a direct current circuit, electric translating apparatus connected between said circuits and comprising a plurality of electric circuits, each of said electric circuits comprising means for transforming alternating current into direct current, and means for controlling said electric circuits in accordance with a predetermined controlling influence.

21. In combination, an alternating current circuit, a direct current circuit, electric translating apparatus connected between said circuits and comprising a plurality of electric circuits, each of said electric circuits comprising means for transforming alternating current into direct current, and means for controlling said circuits in accordance with a predetermined controlling influence to control the current level at which power is transmitted over said direct current circuit.

22. In combination, an alternating current circuit, a direct current circuit, electric translating apparatus connected between said circuits and comprising a plurality of electric circuits, each of said electric circuits comprising means for transforming alternating current into direct current, and means responsive to the power transmitted for controlling said electric circuits to effect control of the current level at which power is transmitted over said direct current circuit.

23. In combination, an alternating current circuit, a direct current circuit, electric translating apparatus connected between said circuits and comprising a plurality of electric circuits, each of said electric circuits including means for transforming alternating current into direct current and including electric valve means, and means responsive to the power transmitted for selectively disconnecting and connecting said electric valve means to said direct current circuit to control the current level at which power is transmitted over said direct current circuit.

24. In combination, an alternating current circuit, a direct current circuit, electric translating apparatus connected between said circuits and comprising a plurality of electric circuits, each of said electric circuits including means for transforming alternating current into direct current and including electric valve means, and means for controlling said electric valve means in accordance with a predetermined controlling influence to control the current level at which power is transmitted over said direct current circuit.

25. In combination, an alternating current circuit, a direct current circuit, electric translating apparatus connected between said circuits and comprising a plurality of electric circuits for transforming alternating current into direct current, and means for selectively disconnecting and connecting said circuits to said direct current circuit to control the current level at which power is transmitted over said direct current circuit.

26. In combination, an alternating current circuit, a direct current circuit, electric translating apparatus connected between said circuits and comprising a plurality of electric circuits, each of said electric circuits comprising means for transforming alternating current into direct current and including electric valve means, and means for selectively disconnecting and connecting said electric valve means to said direct current circuit to control the current level at which power is transmitted over said direct current circuit.

27. In combination, an alternating current circuit, a direct current circuit, electric translating apparatus connected between said circuits and comprising means for transforming alternating current into direct current, and means responsive to a predetermined controlling influence for controlling said last mentioned means to control the current level at which power is transmitted over said direct current circuit.

28. In combination, an alternating current circuit, a direct current circuit, electric translating apparatus connected between said circuits and comprising a plurality of electrical units for transmitting energy therebetween and each unit comprising an inductive network and associated electric valve means for transforming alternating current into direct current, means for connecting said units in series relation with respect to each other and with respect to said direct current circuit, and means for controlling said electric valve means to control the current level at which power is transmitted over said direct current circuit.

29. In combination, an alternating current circuit, a direct current circuit, electric translating apparatus connected between said circuits and comprising a plurality of electrical units, each unit comprising an electric valve means for transforming alternating current into direct current and having an output circuit connected to said direct current circuit, and means for shunting the output circuits of said electric valve means to control the current level at which power is transmitted over said direct current circuit.

30. In combination, an alternating current circuit, a direct current circuit, electric translating apparatus connected between said circuits and comprising a plurality of electrical units each of which includes alternating current terminals and direct current terminals connected to said direct current circuit, and means for controlling the current level at which power is transmitted over said direct current circuit and comprising means for controlling the direct current terminals.

31. In combination, an alternating current circuit, a direct current circuit, electric translating apparatus connected between said circuits and comprising a plurality of electrical units for transmitting energy between said circuits and each comprising alternating current terminals and direct current terminals, means associated with said alternating current terminals for disconnecting and connecting said electrical units to said alternating current circuit, and means for shunting the direct current terminals to control the current level at which power is transmitted over said direct current circuit.

32. In combination, an alternating current supply circuit, an alternating current load circuit, a direct current circuit, transmitting translating apparatus connected between said supply circuit and said direct current circuit, receiving translating apparatus connected between said direct current circuit and said load circuit, said transmitting and receiving apparatus each comprising a plurality of electrical units connected in series relation with each other for transforming alternating current into direct current and each unit comprising an electric valve means having direct current terminals connected to said direct current circuit, and means for controlling said direct current terminals to control the current lever at which power is transmitted over said direct current circuit.

33. In an electric power transmission system for transmitting power between an alternating current supply circuit and an alternating current load circuit and comprising a direct current circuit, the combination of electric translating apparatus connected between said supply circuit and said direct current circuit and including a plurality of electric circuits, each of said electric circuits including means for transforming alternating current into direct current, and means for selectively disconnecting and connecting said electric circuits to said direct current circuit to control the current level at which power is transmitted over said direct current circuit.

34. In combination, an alternating current supply circuit, an alternating current load circuit, a direct current circuit, electric translating apparatus connected between said supply circuit and said direct current circuit, electric translating apparatus connected between said direct current circuit and said load circuit, said translating apparatus connected to said supply circuit and to said load circuit each comprising a plurality of electric circuits each of which includes means for transforming alternating current into direct current or vice versa, and independent means associated with said electric circuits for selectively disconnecting and connecting said electric circuits to said direct current circuit to control the current level at which power is transmitted over said direct current circuit.

35. In combination, a direct current circuit, an alternating current circuit, electric translating apparatus connected between said circuits and comprising a plurality of serially connected inverters, means for connecting and disconnecting said inverters to said direct current circuit to control the amount of power transmitted to said load circuit, and means comprising an electric valve circuit for exchanging power between said direct current circuit and said alternating current circuit.

36. In combination, a direct current circuit, an alternating current circuit, electric translating apparatus connected between said circuits for transforming direct current into alternating current, means for controlling said translating apparatus to transmit different amounts of power to said alternating current circuit, means comprising an electric valve circuit connected between said direct current circuit and said alternating current circuit, and means for controlling said electric valve circuit to absorb power or to supply power in accordance with the power demanded by said alternating current circuit.

37. In combination, a direct current circuit, an alternating current circuit, electric translating apparatus for transmitting power therebetween and comprising a plurality of electric circuits each including an electric valve inverter, means for controlling said electric valve inverters to control the power flow between said direct current circuit and said alternating current circuit, and means for controlling the voltage of said alternating current circuit.

38. In combination, a direct current circuit, an alternating current circuit, electric translating apparatus for transmitting power therebetween and comprising a plurality of electric circuits each including an electric valve inverter connected in series relation with each other, means for controlling said electric valve inverters to control the power flow between said direct current circuit and said alternating current circuit, and means for controlling the power transmitted to said alternating current circuit comprising an auxiliary electric valve circuit energized in series relation with said electric valve inverters and arranged to operate either as a rectifier or as an inverter.

39. In combination, a direct current circuit, an alternating current circuit, electric translating apparatus for transmitting power therebetween and comprising a plurality of electric circuits each including a plurality of electric valve inverters connected in series relation with each other, means for controlling said electric valve inverters to control the power flow between said direct current circuit and said alternating current circuit, an electric valve circuit connected in series relation with said inverters, and means for controlling said electric valve circuit in accordance with the frequency of said alternating current circuit.

40. In combination, a constant current direct current circuit, an alternating current circuit, means connected between said circuits and comprising a winding, an electric valve means for controlling the resultant magnetic field linking said winding to effect transfer of power between said direct current circuit and said alternating current circuit at substantially constant voltage.

41. In combination, a constant current direct current circuit, an alternating current circuit, electric valve means connected to said direct current circuit for transforming direct current of constant value into alternating current of constant value, a transformer connected between said electric valve means and said alternating current circuit, and electric valve means for controlling said transformer to transform alternating current of constant value into alternating current of substantially constant voltage.

42. In combination, a constant current direct current circuit, an alternating current circuit, and translating apparatus connected between said circuits for transforming direct current of constant value into alternating current of constant voltage and comprising a transformer, and electric valve means for controlling said transformer.

43. In combination, a direct current circuit, an alternating current circuit, an inductive network connected between said circuits and having a plurality of phase windings, and a plurality of electric valve means each associated with a different one of said phase windings for controlling the resultant ampere-turns thereof to effect transfer of power from said direct current circuit to said alternating current circuit at substantially constant voltage.

44. In combination, a direct current circuit, a plurality of alternating current load circuits, a plurality of receiving units connected between said direct current circuit and said load circuits and each having a pair of direct current terminals energized from said direct current circuit and each being connected in series relation with the direct current terminals of the other receiving units, each of said receiving units comprising a transformer and associated electric valve means for controlling the resultant magnetic field of said transformer to effect transfer of power from said direct current circuit to the associated alternating current load circuits at substantially constant voltage.

45. In combination, a constant current alternating current supply circuit, an alternating current load circuit, a transformer connected between said supply circuit and said load circuit and comprising a plurality of primary windings and a secondary winding, and means for selectively connecting predetermined primary windings to said supply circuit to control the resultant ampere-turns of said transformer.

46. In combination, a direct current circuit, an alternating current circuit, a plurality of translating circuits for transmitting power between said direct current circuit and said alternating current circuit each of which comprises an electric valve inverter for transforming direct current into alternating current, said electric valve inverters being connected in series relation with each other, and a transformer having a plurality of primary windings and a secondary winding, said primary windings each being connected to be energized by a different one of said electric valve inverters and said secondary winding being connected to said constant voltage circuit.

47. In combination, a direct current circuit, an alternating current circuit, a plurality of serially-connected electric valve inverters having direct current terminals connected to said direct current circuit, a transformer connected between said inverters and said alternating current circuit and having a plurality of primary windings each energized by a different one of said inverters and having a secondary winding connected to said alternating current circuit, and means for controlling the voltage of said alternating current circuit.

48. In combination, a direct current circuit, an alternating current circuit, a plurality of electric valve inverters having direct current terminals connected in series relation with each other, a transformer connected between said inverters and said alternating current circuit and having a plurality of primary windings each energized by a different one of said circuits and having a secondary winding connected to said alternating current circuit, and means for controlling the voltage of said alternating current circuit comprising an electric valve circuit connected between said direct current circuit and said alternating current circuit for controlling the power transmitted to said alternating current circuit.

49. In combination, an alternating current supply circuit, a direct current transmission circuit, a plurality of transmitting units for energizing said direct current circuit from said supply circuit and each including an electric valve rectifier having direct current terminals, the rectifiers being connected in series relation with each other, an alternating current load circuit, a plurality of receiving units connected between said direct current circuit and said load circuit and each including an electric valve inverter having direct current terminals, the inverters being connected in series relation with each other, means for controlling the rectifiers to control the power transmitted over said direct current circuit, and means for controlling the inverters to control the power transmitted to said load circuit.

50. In combination, a direct current transmission circuit, a plurality of transmitting units for energizing said direct current circuit and each including an electric valve rectifier having direct current terminals, said rectifiers being connected in series relation with each other, an alternating current load circuit, a plurality of receiving units connected to be energized from said direct current circuit and each including an electric valve inverter having direct current terminals, the inverters being connected in series relation with each other, means for controlling the number of rectifiers operatively connected to said direct current circuit to effect control of the power transmitted, and means for controlling the number of inverters connected in operative relation with said direct current circuit to control an electrical condition of said load circuit.

51. In combination, a direct current transmission circuit, a plurality of transmitting units for energizing said direct current circuit and each including an electric valve rectifier having direct current terminals, said rectifiers being connected in series relation with each other, an alternating current load circuit, a plurality of receiving units connected to be energized from said direct current circuit and each including an electric valve inverter having direct current terminals, the inverters being connected in series relation with each other, means for controlling the number of rectifiers operatively connected to said direct current circuit to control the voltage of said direct current circuit, and means for controlling the number of inverters operatively connected to said direct current circuit to control the power transmitted to said load circuit.

52. In combination, a direct current transmission circuit, a plurality of transmitting units for energizing said direct current circuit and each including an electric valve rectifier having direct current terminals, the rectifiers being connected in series relation with each other, a plurality of receiving units connected to be energized from said direct current circuit and each including an electric valve inverter having direct current terminals, the inverters being connected in series relation with each other, a plurality of alternating current load circuits each associated with a different one of said inverters, means for connecting the rectifiers in operative relation with said direct current circuit to control the power transmitted over said direct current circuit, and means for controlling the inverters to control the power transmitted to the associated load circuits.

53. In combination, a direct current transmission circuit, a plurality of transmitting units for energizing said direct current circuit and each including an electric valve rectifier having direct current terminals, the rectifiers being connected in series relation with each other, a plurality of receiving units connected to be energized from said direct current circuit and each including an electric valve inverter having direct current terminals, the inverters being connected in series relation with each other, an alternating current load circuit connected to be energized by said inverters, means for controlling the rectifiers to control the power transmitted over said direct current circuit, and means for controlling the inverters to control the power transmitted to said load circuit.

54. In combination, a direct current transmission circuit, a plurality of transmitting units for energizing said direct current circuit and each including an electric valve rectifier having direct current terminals, the rectifiers being connected in series relation with each other, a plurality of receiving units connected to be energized from said direct current circuit and each including an electric valve inverter having direct current terminals, the inverters being connected in series relation with each other, means for selectively disconnecting and connecting said rectifiers to said direct current circuit to control the voltage of said direct current circuit, an alternating current load circuit, and means for selectively disconnecting and connecting said inverters to said direct current circuit to control an electrical condition of said load circuit.

55. In combination, a direct current transmission circuit, a plurality of transmitting units for energizing said direct current circuit and each including an electric valve rectifier having direct current terminals, the rectifiers being connected in series relation with each other, a plurality of receiving units connected to be energized from said direct current circuit and each including an electric valve inverter having direct current terminals, the inverters being connected in series relation with each other, means for selectively disconnecting and connecting said rectifiers to said direct current circuit to control the voltage of said direct current circuit, an alternating current load circuit, and means for selectively disconnecting and connecting said inverters to said direct current circuit to control the voltage of said alternating current load circuit.

56. In combination, a direct current transmission circuit, a plurality of transmitting units for energizing said direct current circuit and each including an electric valve rectifier having direct current terminals, the rectifiers being connected in series relation with each other, a plurality of receiving units connected to be energized from said direct current circuit and each including an electric valve inverter having direct current terminals, the inverters being connected in series relation with each other, means for selectively disconnecting and connecting said rectifiers to said direct current circuit to control the voltage of said direct current circuit, an alternating current load circuit, and means responsive to the frequency of said alternating current circuit for selectively disconnecting and connecting said inverters to said direct current circuit.

57. In combination, an alternating current circuit, a direct current transmission line, electric translating apparatus for energizing said transmission line from said alternating current circuit and comprising electric valve apparatus of the type including a control member, and means for energizing said control member to effect transfer of power over said transmission line at substantially constant voltage for a predetermined range of power transfer and to effect a predetermined departure from the constant voltage characteristic when the power transfer exceeds a predetermined value.

58. In combination, an alternating current circuit, a direct current transmission line, electric translating apparatus for energizing said transmission line from said alternating current circuit and comprising electric valve means of the type having a control member for controlling the conductivity thereof, and means for energizing said control member for transmitting power over said transmission line at a substantially constant voltage and variable current within a predetermined range of power transfer and for transmitting power over said transmission line at a substantially constant current and variable voltage when the power transfer tends to exceed said predetermined range.

59. In combination, an alternating current circuit, a direct current transmission line, electric translating apparatus for energizing said transmission line from said alternating current circuit and comprising electric valve means of the type having an anode, a cathode and a control member for controlling the conductivity thereof, and means for impressing on said control member a periodic voltage of variable phase displacement with respect to the anode-cathode voltage of said electric valve means to transmit power over said transmission line at a substantially constant voltage and variable current within a predetermined range of power transfer and for controlling said electric valve means to effect power transfer over said line at a substantially constant current and variable voltage when the power transfer tends to exceed said predetermined range.

60. In combination, an alternating current circuit, a direct current transmission line, electric translating apparatus for energizing said transmission line from said alternating current circuit and comprising electric valve means of the type having a control member, and means for energizing said control member to effect transfer of power over said transmission line at substantially constant voltage within a predetermined range of power transfer and to effect power transfer at a substantially constant power level when the power tends to exceed said range.

61. In an electric power transmission system for transmitting power over a direct current transmission line, the combination of means for energizing said transmission line, an alternating current load circuit, receiving translating apparatus connected between said transmission line and said load circuit and comprising electric valve means for transforming direct current into alternating current and including a dynamo-electric machine of the synchronous type having an armature winding connected to said load circuit and having a field winding, and means for controlling the energization of said field winding to control the voltage of said load circuit.

62. In an electric power transmission system for transmitting power over a direct current transmission line, the combination of means for energizing said transmission line, an alternating current load circuit, receiving translating apparatus connected between said transmission line and said load circuit and comprising electric valve means for transforming direct current into alternating current and including a dynamo-electric machine of the synchronous type having an armature winding connected to said load circuit and having a field winding, and means for controlling the energization of said field winding to control the voltage and frequency of said load circuit.

63. In an electric power transmission system for transmitting power over a direct current transmission line, the combination of means for energizing said transmission line, an alternating current load circuit, translating apparatus connected between said transmission line and said load circuit and comprising electric valve means for transforming direct current into alternating current and including a dynamo-electric machine of the synchronous type having an armature winding connected to said load circuit and having a field winding, and means for controlling the energization of said field winding in accordance with the load transmitted by said system.

64. In an electric power transmission system for transmitting power over a direct current transmission line, the combination of means for energizing said transmission line, an alternating current load circuit, translating apparatus connected between said transmission line and said load circuit and comprising electric valve means for transforming direct current into alternating current and including a dynamo-electric machine of the synchronous type having an armature winding connected to said load circuit and having a field winding, and means for controlling the energization of said field winding in accordance with the current of said alternating current circuit to control the frequency thereof.

65. In an electric power transmission system for transmitting power over a direct current transmission line, the combination of means for energizing said transmission line, an alternating current load circuit, translating apparatus connected between said transmission line and said load circuit and comprising electric valve means for transforming direct current into alternating current and including a dynamo-electric machine of the synchronous type having an armature winding connected to said load circuit and having a field winding, and means for controlling the energization of said field winding to supply the reactive volt-amperes required by said load circuit and to effect control of the frequency of said load circuit.

66. In an electric power transmission system for transmitting power over a direct current transmission line, the combination of means for energizing said transmission line, an alternating current load circuit, translating apparatus connected between said transmission line and said load circuit and comprising electric valve means for transforming direct current into alternating current and including a dynamo-electric machine of the synchronous type having an armature winding connected to said load circuit and having a field winding, and means for controlling the energization of said field winding in accordance with a predetermined electrical condition of said load circuit to control the voltage and frequency of said load circuit.

67. In an electric power transmission system for transmitting power over a direct current transmission line, the combination of means for energizing said transmission line, an alternating current load circuit, apparatus connected between said transmission line and said load circuit and comprising electric valve means for transforming direct current into alternating current, means for controlling said electric valve means to control the power transmitted by said system, and means for controlling the voltage and frequency of said load circuit and comprising a dynamo-electric machine having an armature winding connected to said load circuit and having a field winding variably energized in accordance with the load transmitted by said load circuit.

68. In an electric power transmission system for transmitting power over a direct current transmission line, the combination of means for energizing said transmission line, an alternating current load circuit, translating apparatus connected between said transmission line and said load circuit and comprising electric valve means for transforming direct current into alternating current, said electric valve means being of the type comprising a control member for controlling the conductivity thereof, means for energizing said control member to control the power transmitted by said system, a dynamo-electric machine of the synchronous type having an armature winding connected to said load circuit and having a field winding, and means for energizing said field winding to control the voltage and frequency of said load circuit.

69. In combination, a direct current circuit, electric translating apparatus for energizing said direct current circuit, an alternating current load circuit, translating apparatus connected between said direct current circuit and said load circuit and comprising electric valve means for transforming direct current into alternating current, a dynamo-electric machine of the synchronous type energized from said load circuit, and means for controlling the voltage of said direct current circuit to control the voltage and frequency of said alternating current load circuit.

70. In combination, an alternating current supply circuit, a direct current circuit, electric translating apparatus connected between said supply circuit and said direct current circuit and comprising means for transforming alternating current into direct current, an alternating current load circuit, translating apparatus connected between said direct current circuit and said load circuit and comprising electric valve means for transforming direct current into alternating current, and means for controlling the voltage of said direct current circuit to control the voltage of said alternating current load circuit.

71. In combination, an alternating current supply circuit, a direct current circuit, electric translating apparatus connected between said supply circuit and said direct current circuit and comprising means for transforming alternating current into direct current, an alternating current load circuit, translating apparatus connected between said direct current circuit and said load circuit and comprising electric valve means for transforming direct current into alternating current, a synchronous condenser connected to said load circuit, and means for controlling the voltage of said direct current circuit to control the voltage and frequency of said alternating current load circuit.

72. In combination, an alternating current supply circuit, a direct current circuit, electric translating apparatus connected between said supply circuit and said direct current circuit and comprising means for transforming alternating current into direct current, an alternating current load circuit, translating apparatus connected between said direct current circuit and said load circuit and comprising electric valve means for transforming direct current into alternating current, and means responsive to the voltage of said alternating current circuit for controlling the votage of said direct current circuit to maintain the voltage of said alternating current load circuit at a substantially constant value.

73. In combination, an alternating current circuit, a dynamo-electric machine of the synchronous type for energizing said circuit and having a field winding, a direct current circuit, electric valve translating apparatus connected between said alternating current circuit and said direct current circuit for supplying energy thereto, an alternating current load circuit, electric valve translating apparatus connected between said direct current circuit and said load circuit for transforming direct current into alternating current, and means responsive to the frequency of said load circuit for controlling the energization of said field winding.

74. In combination, an alternating current circuit, a dynamo-electric machine of the synchronous type for energizing said circuit and having a field winding, a direct current circuit, electric valve translating apparatus connected between said alternating current circuit and said direct current for supplying energy thereto, an alternating current load circuit, electric valve translating apparatus connected between said direct current circuit and said load circuit for transforming direct current into alternating current, a dynamo-electric machine of the synchronous type having an armature winding connected to said load circuit and having a field winding, means for controlling the energization of said last mentioned field winding to control the voltage of said load circuit, and means responsive to the frequency of said load circuit for controlling the energization of said first mentioned field winding.

75. In combination, an alternating current circuit, a dynamo-electric machine of the synchronous type for energizing said circuit and having a field winding, a direct current circuit, electric valve translating apparatus connected between said alternating current circuit and said direct current circuit for supplying energy thereto, an alternating current load circuit, electric valve translating apparatus connected between said direct current circuit and said load circuit for transforming direct current into alternating current, a dynamo-electric machine of the synchronous type having an armature winding connected to said load circuit and having a field winding, means for controlling the energization of said last mentioned field winding to control the voltage of said load circuit, and means for controlling the energization of said first mentioned field winding in response to the frequency of said load circuit and comprising a tuned resonant circuit.

76. In combination, an alternating current circuit, a dynamo-electric machine of the synchronous type for energizing said circuit and having a field winding, a direct current circuit, electric valve translating apparatus connected between said alternating current circuit and said direct current circuit for supplying energy thereto, an alternating current load circuit, electric valve translating apparatus connected between said direct current circuit and said load circuit for transforming direct current into alternating current, means for controlling said last mentioned electric valve means, a synchronous condenser having an armature winding connected to said load circuit and having a field winding, means for controlling the energization of said last mentioned field winding to control the voltage of said load circuit, and means for controlling the energization of said first mentioned field winding in accordance with the frequency of said load circuit.

77. In combination, a plurality of alternating current supply circuits, a direct current circuit, a plurality of individual translating circuits each connected between a different one of said supply circuits and said direct current circuit, each of said translating circuits including a plurality of serially connected rectifiers, means for controlling said rectifiers to transmit power to said direct current circuit at different predetermined current levels, a plurality of alternating current load circuits, means connected between each of said load circuits and said direct current circuit and including a plurality of inverters for transforming direct current into alternating current, and means for controlling said inverters to control the amount of power transmitted to the various associated load circuits.

78. In combination, a plurality of alternating current supply circuits, a direct current circuit, a plurality of individual translating circuits each connected between a different one of said supply circuits and said direct current circuit, each of said translating circuits including a plurality of serially connected rectifiers, means for controlling said rectifiers to transmit power to said direct current circuit at different predetermined current levels, a plurality of alternating current load circuits, means connected between each of said load circuits and said direct current circuit and each including a plurality of inverters for transforming direct current into alternating current, and means for controlling said inverters to transform constant current direct current to constant voltage alternating current independently of the current level at which power is transmitted over said direct current circuit.

79. In combination, a plurality of alternating current supply circuits, a direct current circuit, a plurality of individual translating circuits each connected between a different one of said supply circuits and said direct current circuit, each of said translating circuits including a plurality of serially connected rectifiers, means for rendering selectively operative and inoperative said rectifiers to control the current level at which power is transmitted over said direct current circuit, an alternating current load circuit, an electric translating circuit connected between said direct current circuit and said load circuit and including a plurality of serially connected inverters for transforming direct current into alternating current and a transformer connected between said inverters and said load circuit, said transformer having a plurality of primary windings each energized by a different one of said inverters and a secondary winding connected to said load circuit, and means for rendering different numbers of said inverters operative and inoperative to control the power supplied to said load circuit.

80. In combination, an alternating current supply circuit, a direct current circuit, translating apparatus connected between said supply circuit and said direct current circuit and including a plurality of serially connected rectifiers, means for rendering selectively operative and inoperative said rectifiers to control the current level at which power is transmitted over said direct current circuit, a plurality of alternating current load circuits, a plurality of electric translating circuits each connected between said direct current circuit and a different one of said load circuits and each including a plurality of serially connected inverters for transforming direct current into alternating current and a transformer connected between said inverters and the associated load circuit, said transformers each having a plurality of primary windings and each primary winding being energized by a different one of said inverters and having a secondary winding connected to the associated load circuit, and means for rendering different numbers of said inverters operative and inoperative to control the power supplied to said load circuit.

81. In combination, a direct current transmitting line, an alternating current circuit, means for energizing said transmission line from said alternating current circuit and comprising a plurality of serially-connected rectifiers each comprising electric valve means of the controlled type having a control member for controlling the conductivity thereof, and means responsive to an electrical condition of said transmission line for controlling the energization of the control members.

82. In combination, a direct current transmission line, an alternating current circuit, means for energizing said transmission line from said alternating current circuit and comprising a plurality of serially-connected rectifiers each comprising a plurality of electric valve means of the controlled type having a control member for controlling the conductivity thereof, and means responsive to a predetermined electrical condition of said transmission line for controlling the energization of the control members of at least one of said rectifiers to render said one rectifier nonconductive when the power transmitted by said transmission line tends to exceed a predetermined value.

83. In combination, a direct current transmission line, an electric valve transmitter station for energizing said transmission line, an alternating current load circuit, an electric valve inverter connected between said direct current circuit and said load circuit for transmitting power from said direct current circuit to said load circuit, and means for controlling said inverter so that the slope of the volt-ampere characteristic of said inverter is less than the volt-ampere characteristic of said transmitter station.

84. In combination, a direct current transmission line, an electric valve transmitter station for energizing said transmission line, an alternating current load circuit, an electric valve inverter connected between said direct current circuit and said load circuit for transmitting power from said direct current circuit to said load circuit, and a dynamo-electric machine of the synchronous type connected to said alternating current load circuit to control said inverter so that the slope of the inverter volt-ampere characteristic is less than the slope of the volt-ampere characteristic of said transmitter station.

85. In combination, a direct current circuit, an alternating current circuit, electric translating apparatus connected between said circuits and comprising transforming means having a plurality of groups of primary windings and a secondary winding connected to said alternating current circuit, a plurality of serially connected electric valve inverters each having direct current terminals connected to said direct current circuit, each of said inverters being connected to a different one of said groups of primary windings, and means for selectively shunting the direct current terminals of said inverters to effect selective energization of said groups of primary windings.

ERNST F. W. ALEXANDERSON.

CERTIFICATE OF CORRECTION.

Patent No. 2,208,183.                                     July 16, 1940.

ERNST F. W. ALEXANDERSON.

It is hereby certified that error appears in the printed specification of the above numbered patent requiring correction as follows: Page 2, first column, line 42, for "substanially" read --substantially--; page 6, second column, line 4, for "stabiltiy" read --stability--; page 14, first column, line 57, claim 3, for the word "lever" read --level--; page 15, first column, line 34, claim 14, for "operative" read --operating--; page 16, second column, line 33, claim 32, for the word "lever" read --level--; page 20, second column, line 12, claim 72, for "votage" read --voltage--; and that the said Letters Patent should be read with this correction therein that the same may conform to the record of the case in the Patent Office.

Signed and sealed this 3rd day of September, A. D. 1940.

(Seal)                                                                  Henry Van Arsdale,
Acting Commissioner of Patents.